United States Patent
Okada et al.

(10) Patent No.: US 7,551,200 B2
(45) Date of Patent: Jun. 23, 2009

(54) CAMERA CONTROLLER AND ZOOM RATIO CONTROL METHOD FOR THE CAMERA CONTROLLER

(75) Inventors: Susumu Okada, Kanagawa (JP); Kensuke Maruya, Kanagawa (JP)

(73) Assignee: Panasonic Corporation, Osaka (JP)

(*) Notice: Subject to any disclaimer, the term of this patent is extended or adjusted under 35 U.S.C. 154(b) by 492 days.

(21) Appl. No.: 10/599,195

(22) PCT Filed: Jan. 24, 2006

(86) PCT No.: PCT/JP2006/301067

§ 371 (c)(1),
(2), (4) Date: Sep. 22, 2006

(87) PCT Pub. No.: WO2006/080316

PCT Pub. Date: Aug. 3, 2006

(65) Prior Publication Data

US 2008/0239102 A1 Oct. 2, 2008

(30) Foreign Application Priority Data

Jan. 25, 2005 (JP) .............................. 2005-016475

(51) Int. Cl.
*H04N 5/225* (2006.01)

(52) U.S. Cl. ............... 348/207.11; 348/159; 348/211.8; 348/211.11; 348/240.99

(58) Field of Classification Search ................. 348/143, 348/148, 149, 150, 153, 157, 207.1, 207.11, 348/211.99, 211.4, 211.6–211.9, 211.11, 348/211.13, 240.99, 240.1–240.3
See application file for complete search history.

(56) References Cited

U.S. PATENT DOCUMENTS

| 6,697,105 B1 | 2/2004 | Kato et al. |
| 6,909,458 B1 | 6/2005 | Suzuki et al. |
| 7,358,985 B2 * | 4/2008 | Uchihashi et al. ......... 348/14.08 |
| 2003/0025800 A1 * | 2/2003 | Hunter et al. .......... 348/208.13 |
| 2008/0178232 A1 * | 7/2008 | Velusamy .................... 725/88 |
| 2008/0186379 A1 * | 8/2008 | Ishigame et al. ............ 348/116 |
| 2008/0278571 A1 * | 11/2008 | Mora et al. ................... 348/48 |

FOREIGN PATENT DOCUMENTS

| JP | 9289607 | 11/1997 |
| JP | 200194860 | 4/2001 |

OTHER PUBLICATIONS

International Search Report dated Apr. 18, 2006.

* cited by examiner

*Primary Examiner*—Lin Ye
*Assistant Examiner*—Chriss S Yoder, III
(74) *Attorney, Agent, or Firm*—Dickinson Wright, PLLC

(57) ABSTRACT

Camera control apparatus enabling a user to intuitively understand a photographing direction and zoom magnification of a camera at the time of switching over an image, and enabling camera control to be started immediately. At camera control apparatus (120), camera image switching section (121) switches over images of cameras instructed to be switched over to by a user. Zoom magnification control sections (124, 125, 126) acquire zoom magnification of a camera instructed to be switched over to, set zoom magnification of a camera before switching of the camera image switching section (121) to a reference magnification lower than the acquired zoom magnification, and change zoom magnification of the camera after switching from the reference magnification to the acquired zoom magnification. Image display section (122) then displays the image of the camera image switching section (121) has switched over to.

9 Claims, 34 Drawing Sheets

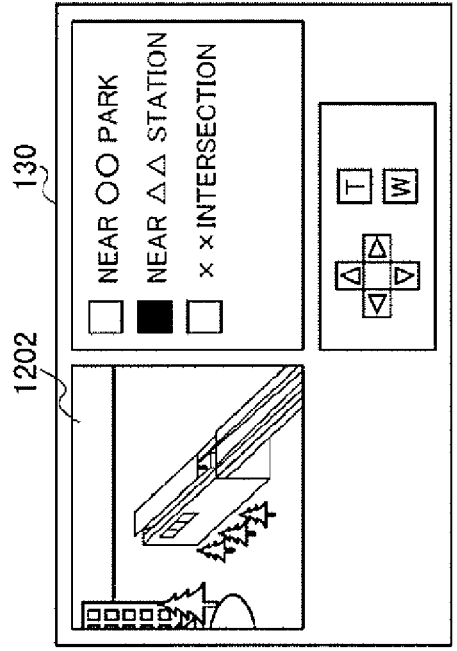
FIG.17A
FIG.17B
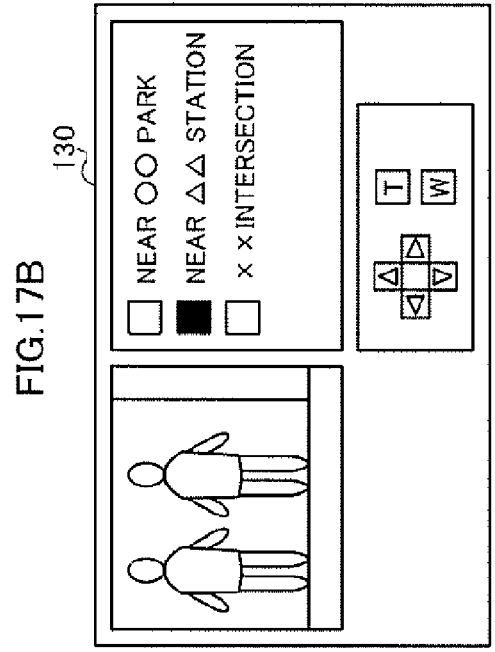
FIG.17C
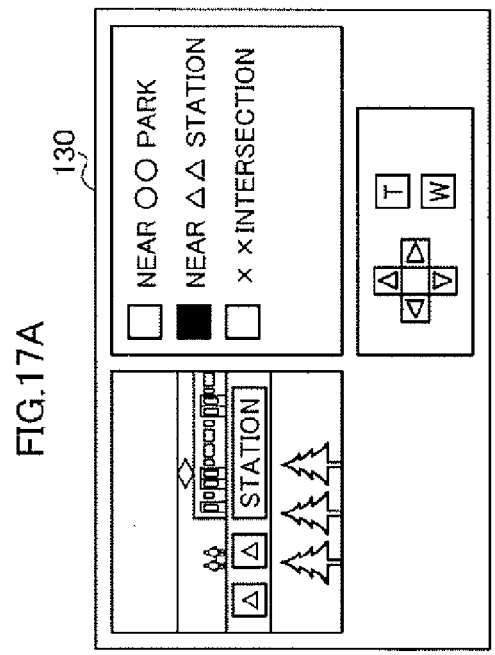
FIG.17D

BEFORE SWITCHING  AFTER SWITCHING

CAMERA IMAGES BEFORE SWITCHING

CAMERA IMAGES AFTER SWITCHING

CAMERA CONTROLLER AND ZOOM RATIO CONTROL METHOD FOR THE CAMERA CONTROLLER

TECHNICAL FIELD

The present invention relates to a camera control apparatus and a zoom magnification control method for this camera control apparatus, and particularly relates to camera control apparatus controlling a plurality of cameras and displaying one or a plurality of images of this plurality of cameras and a zoom magnification control method for this camera control apparatus.

BACKGROUND ART

In recent years, as bandwidths have broadened in comparison to preceding analog networks as the digitalization of networks such as ISDN and ASDL advances, systems for transmitting and receiving image data over networks have rapidly widespread. As one such system, there is a remote monitoring system enabling observation at one location of images from a plurality of cameras arranged remotely. With this remote monitoring system, typically, one of the camera images being observed by an observer is selected, and the photographing direction for the selected camera image is made to be controllable.

A screen example for this typical remote monitoring system is shown in FIG. 1. Screen 10 of a remote monitoring system shown in FIG. 1 is composed of image display region 11 that displays images for a plurality of remotely arranged cameras, camera select region 12 that selects a camera to display an image from the plurality of installed cameras, and camera control region 13 that controls the camera selected by camera select region 12. The user observing the image can observe locations where the user wants to see from those displayed at camera select region 12 by clicking icon 14 so as to switch over between cameras.

A configuration for this kind of remote monitoring system is shown in FIG. 2. The remote monitoring system shown in FIG. 2 is composed of a plurality of cameras 20a to 20n installed remotely, camera control apparatus 21 that receives and plays back images from cameras 20a to 20n and controls the photographing direction and zoom magnification etc. of cameras 20a to 20n, monitor 22 that displays camera images, and pointing device 23 such as a mouse etc. that controls cameras 20a to 20n and instructs images for display.

Camera control apparatus 21 is configured from camera image switching section 24 that receives images from the plurality of cameras 20a to 20n and switches images by instructions from the user, image display section 25 that displays images of cameras 20a to 20n at monitor 22, camera control instruction receiving section 26 switching camera images to be displayed and receiving instructions from a user for controlling photographing direction and zoom magnification of a camera, and camera control section 27 that instructs for controlling to cameras 20a to 20n and that instructs for switching of images to be displayed at camera image switching section 24.

With this kind of remote monitoring system, a user designates cameras 20a to 20n which the user wants to observe from the plurality of cameras 20a to 20n from camera select region 12 shown in FIG. 1 by pointing device 23. camera control instruction receiving section 26 then receives a control instruction from a user and reports the instruction to camera control section 27. Camera control section 27 stores that an instruction for camera control received from camera control instruction receiving section 26 is for a camera designated by a user, and instructs switching of an image of a camera displayed at monitor 22 to camera image switching section 24. Camera image switching section 24 sends an image for which an instruction is received from camera control section 27 to image display section 25 and image display section 25 displays this image at monitor 22.

FIG. 1 is for the case of a configuration displaying just one image for a camera of the images for the plurality of cameras 20a to 20n but monitoring systems displaying a plurality of camera images at the same time also exist, as shown in FIG. 3. This kind of display method has the drawback that it is not possible to observe detailed portions of the image because the display region for an image for each one camera is small. However, it is possible for a user to view an image which the user wants to see without instructing for switching over to this image by moving their line of sight. In this case, in order to select the camera the user wants to control, it is general to click image 30 that is being displayed instead of camera selection region 12 of FIG. 1.

Further, as a method for selecting one camera of a plurality of existing cameras, methods exist where, as shown in FIG. 4, a location where a camera is installed is shown on a map by an icon, with a user then selecting an icon on the map (see, for example, Patent Document 1).

The camera control apparatus shown in FIG. 4 includes map 40 that displays icons at locations where cameras are installed, image display region 42 that displays the selected camera image, and camera control region 43 that controls the selected camera. Icon 41 on map 40 displaying the d photographing direction and field of view of the camera is selected, and a user can then display an image which the user wants to see by controlling a straight line indicating a boundary line of the Field of view and a photographing direction of the camera by a pointing device.

FIG. 5 is an outline view showing the state of a camera image before and after switching at the time of switching over cameras by the method of the related art. FIG. 5A shows the state of a camera image before switching, and FIG. 5B shows a camera image at the moment that the image is switched to the instructed camera as a result of a user clicking on icon 50 by a pointing device etc.

Patent Document 1: Japanese Patent Application Laid-Open No. HEI9-289607.

DISCLOSURE OF INVENTION

Problems to be Solved by the Invention

As a system for monitoring images of remote cameras via a network, application such as in monitoring systems enabling only specific people to monitor certain determined locations and applications such as web camera systems for looking at images of cameras that are exhibited to an unspecified large number of people can mainly be considered. Of these systems, in the case of camera images for application in monitoring systems, people observing the camera images observe the images periodically once a day or once an hour etc., and the person observing the image is capable of instantaneously determining which direction a camera is currently facing at the moment that the camera is switched over.

However, in the case of camera images for an application such as a web camera system, a user observing an image does not view the camera image periodically. Further, as an unspecified large number of users respectively observe individual camera images with it being possible for each user making observations to freely change the photographing direction and zoom magnification of the camera, the camera is not limited to photographing the default position. As a result, even with camera images that a user has observed in the past, when a camera is selected and an image is switched over from the state shown in FIG. 5A to the state shown in FIG. 5B, it is not possible for a user to intuitively determine what direction the camera is photographing in simply by looking at the image.

Further, in the event that the photographing direction cannot be understood, it is not possible for a user to soon understand what kind of control should be carried out in order to photograph a location which the user wants to observe using the selected camera and time is therefore required to complete control of the camera to the location which the user finally wants to observe.

For example, in the event that a plurality of camera images are displayed at the same time as shown in FIG. 3, the photographing direction for individual cameras changes as time goes by as a result of a plurality of users accessing the respective cameras and controlling the cameras. It is therefore difficult for a user to intuitively determine which direction a camera is facing in when moving the line of view at the moment of viewing another camera image.

Further, in the event that the photographing direction and zoom magnification of the camera are displayed on the screen as shown in FIG. 4, camera is controlled while alternately viewing map display region 40 and image display region 42 rather than just viewing the image the user finally wants to view. Therefore, it takes time for a user that does not periodically utilize the system to intuitively understand which direction an image is being photographed in.

Further, in patent document 1, it is necessary for a user to repeat an operation of looking at map display region 40 and controlling the field of view, looking at a camera image and confirming whether the photographing direction and zoom magnification is that desired by the user, and looking again at map display region 40 and then carrying out adjustment. This requires time up to the camera being made to face in the photographing direction the user wants to observe.

It is therefore the object of the present invention to provide a camera control apparatus and a zoom magnification control method for this camera control apparatus enabling a user to intuitively understand a photographing direction and zoom magnification of a camera at the time of switching over an image, and enabling control of a camera to be started immediately in order for a user to observe an image.

Means for Solving the Problem

Camera control apparatus of the present invention adopts a configuration where camera control apparatus controlling a plurality of cameras and displaying one or a plurality of images of the plurality of cameras comprises an image switching section that switches over to an image of a camera instructed to be switched over to by a user, a zoom magnification control section that acquires zoom magnification of the camera instructed to be switched over to, changes the zoom magnification of the camera to a reference magnification lower than the acquired zoom magnification before switching of the image switching section, and changes zoom magnification of the camera after switching from the reference magnification to the acquired zoom magnification, and an image display section that displays an image of the camera the image switching section switches over to.

Advantageous Effect of the Invention

According to the present invention, when an image is switched over, a user can intuitively understand the photographing direction and zoom magnification of a camera so that it is possible for a user to start control of a camera for observing an image immediately.

BRIEF DESCRIPTION OF THE DRAWINGS

FIG. 17 shows examples of a way of changing a screen when a camera control apparatus according to Embodiment 2 of the present invention switches cameras;

BEST MODE FOR CARRYING OUT THE INVENTION

Now, preferred embodiments of the present invention will be described with reference to the accompanying drawings.

EMBODIMENT 1

Figure 6:
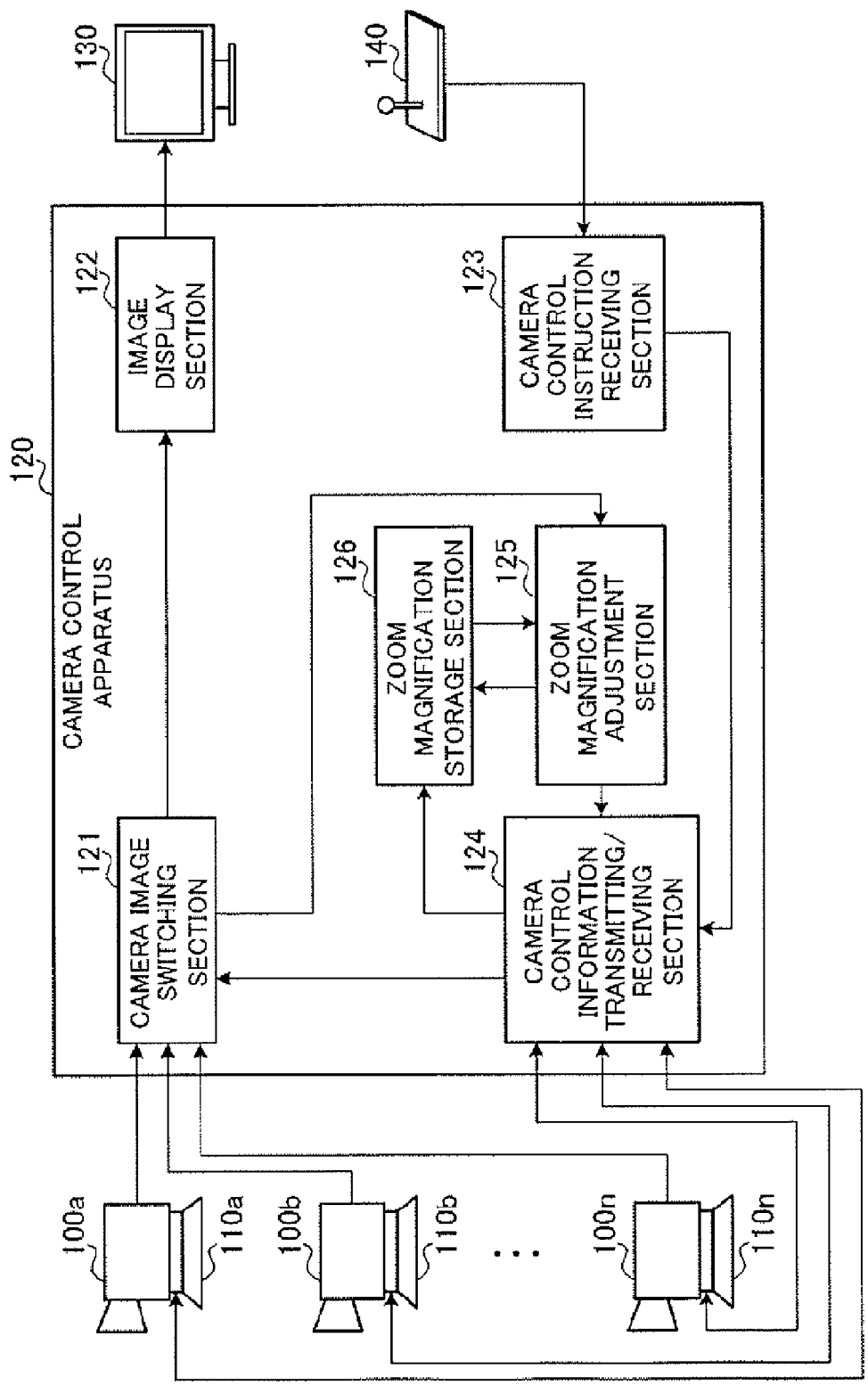
FIG. 6 is a block view showing a configuration of a camera control apparatus according to Embodiment 1 of the present invention.

FIG. 6 is a configuration view showing an example of a remote monitoring system containing a camera control apparatus according to Embodiment 1 of the present invention. This remote monitoring system has a plurality of remotely installed cameras $100a$ to $100n$, camera control apparatus 120 that receives and plays images from cameras $100a$ to $100n$ and controls the photographing direction and zoom magnification etc of cameras $100a$ to loon, monitor 130 that displays camera images sent from camera control apparatus 120, and pointing device 140 such as a mouse etc. that instructs control of and images to be displayed for cameras $100a$ to loon at camera control apparatus 120. Here, cameras $100a$ to $100n$, monitor 130 and pointing device 140 are, for example, connected to camera control apparatus 120 via a network such as, for example, the Internet.

As shown in FIG. 6, camera control apparatus 120 has camera image switching section 121 that switches one or a plurality of images of the plurality of remotely installed cameras $100a$ to $100n$, image display section 122 that displays images switched over to by camera image switching section 12', camera control instruction receiving section 123 that receives instructions of pointing device 140, camera control information transmitting/receiving section 124 that instructs camera $100a$ to loon to control photographing direction and zoom magnification of the cameras, and inquires about and receives current photographing angle, photographing direction and zoom magnification etc. of cameras $100a$ to $100n$, zoom magnification adjustment section 125 that decides zoom magnification of cameras $100a$ to $100n$, and zoom magnification storage section 126 that stores zoom magnification of cameras $100a$ to $100n$.

Camera control apparatus 120 receives images for the plurality of cameras $100a$ to $100n$ and displays an image or one of these cameras at monitor 130. The camera image displayed at monitor 130 is designated by pointing device 140 of a mouse etc. connected to camera control apparatus 120. Further, when the photographing point, photographing direction and zoom magnification of a camera are instructed by pointing device 140, camera control apparatus 120 sends a camera control signal controlling the camera to the camera instructed for display by pointing device 140. Photographing direction zoom control equipments $110a$ to $110n$ connected to cameras $100a$ to $100n$ receive camera control signals sent from camera control apparatus 120 and control the photographing point, photographing direction, and zoom magnification of cameras $100a$ to $100n$.

Figure 7:
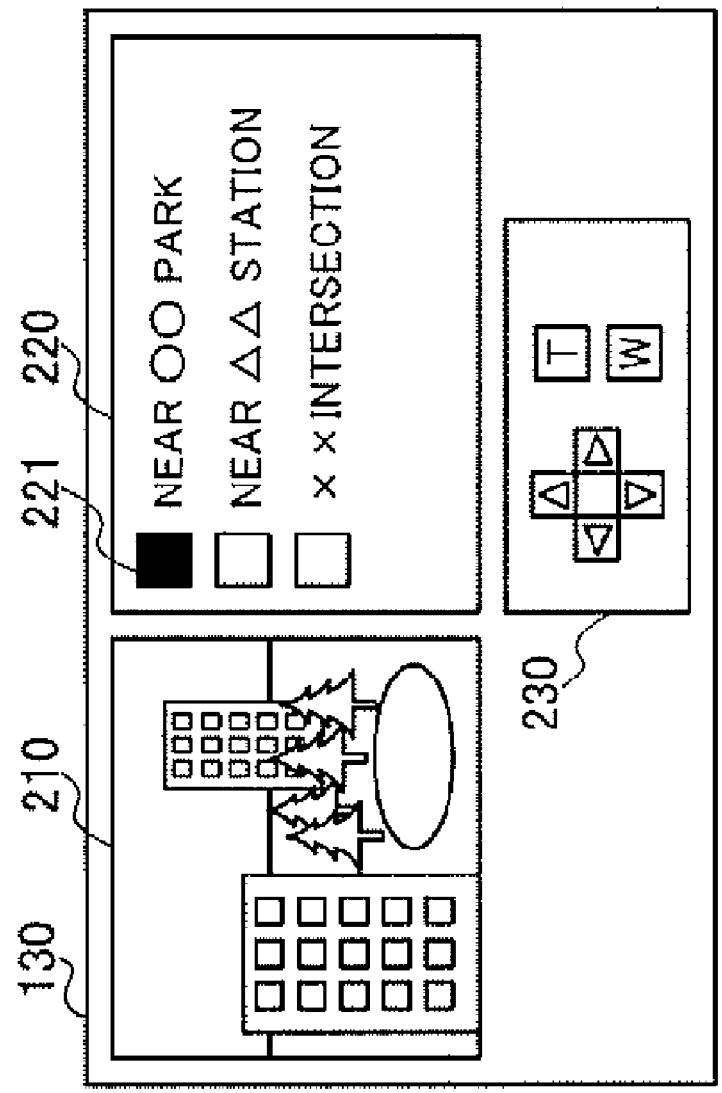
FIG. 7 shows a display example of a monitor according to Embodiment 1 of the present invention.

Next, examples of a camera image and a camera control icon displayed at monitor 130 are shown in FIG. 7. Image display region 210, camera designation region 220, and camera control icon display region 230 are displayed at monitor 13. In FIG. 7, an example is shown where an image for one camera of the plurality of installed cameras $100a$ to loon is displayed at image display region 210, but images for a plurality of or all of the cameras $100a$ to $100n$ may be displayed. A description of the locations where the plurality of cameras are installed and icons 221 designating the cameras are displayed on camera designation region 220. The user designating and controlling the cameras by looking at the monitor selects cameras $100a$ to $100n$ for displaying images by clicking this icon 221 with pointing device 140. Further, the user can control cameras $100a$ to $100n$ designated by the icon 221 using up, down, left and right, and zoom in and zoom out icons displayed at camera control icon display region 230.

Figure 8:
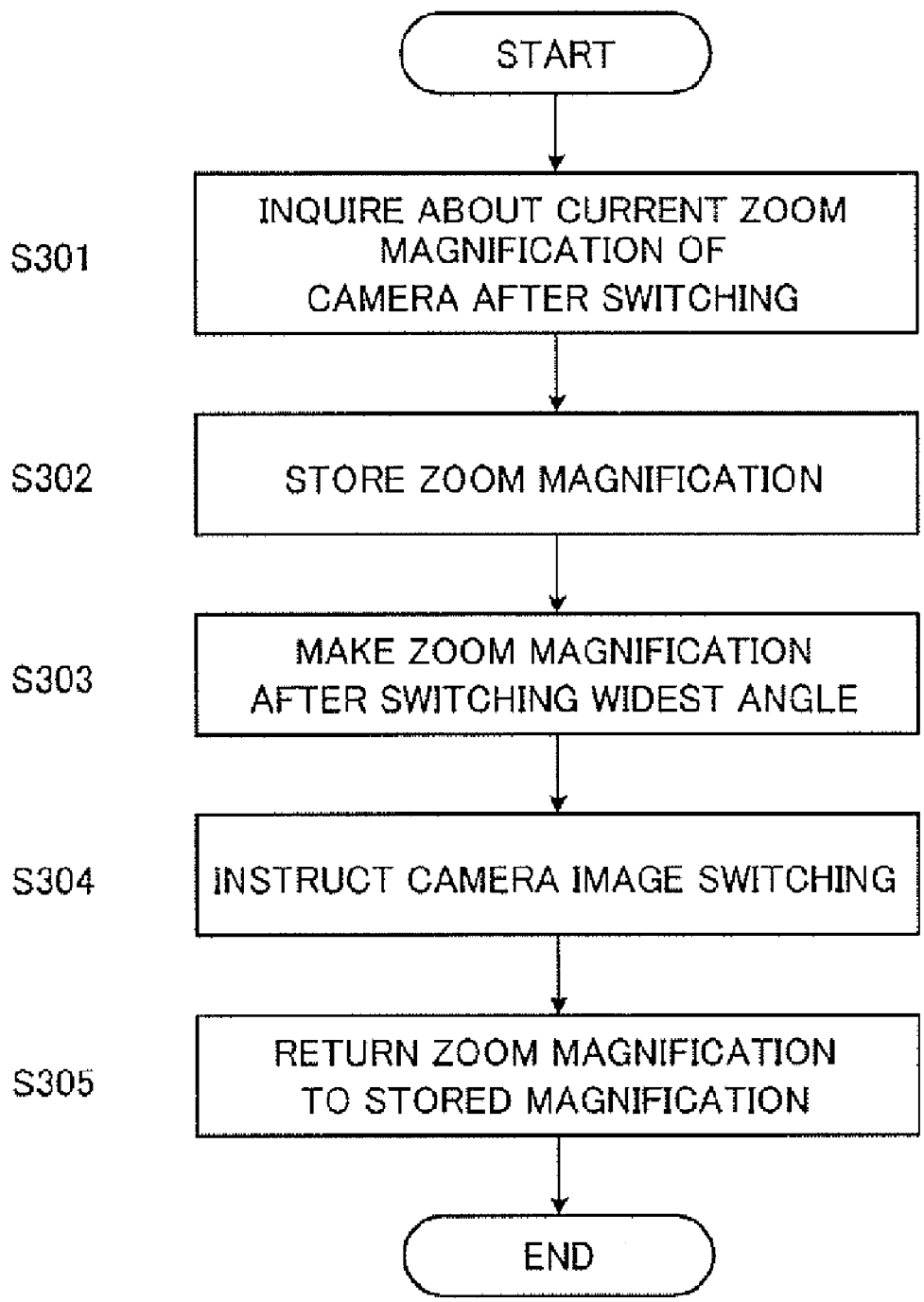
FIG. 8 is a flow chart showing the flow of a camera control operation of a camera control apparatus according to Embodiment 1 of the present invention.
Figure 9A:
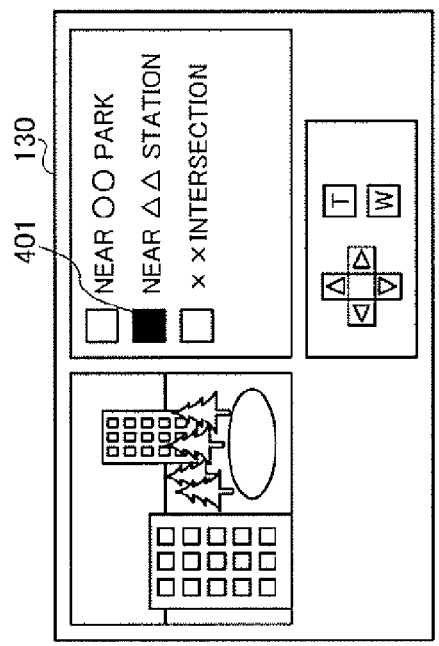
FIG. 9 shows examples of a way of changing a screen when a camera control apparatus according to Embodiment 1 of the present invention switches cameras.
Figure 9B:
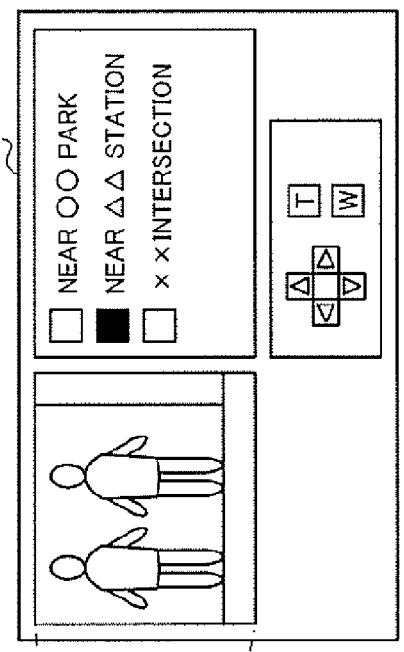
Figure 9C:
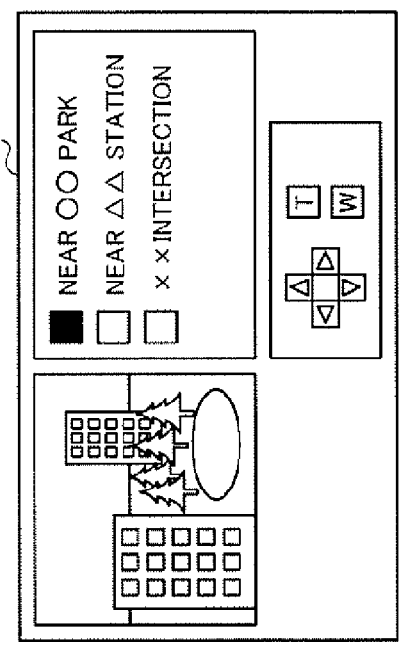
Figure 9D:
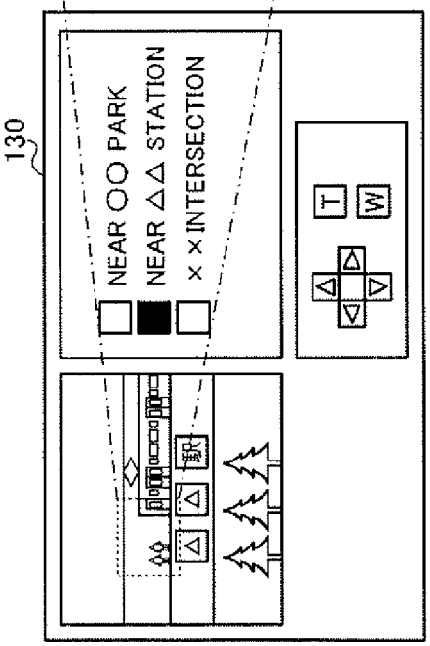

Next, a description is given of the flow of an operation where camera control apparatus 120 controls zoom magnification of cameras $100a$ to $100n$ using FIG. 8.

FIG. 8 is a flow chart showing the flow of a camera control operation of camera control apparatus 120 when a camera image switching instruction is given by the user in this embodiment.

When camera control instruction receiving section 123 within camera control apparatus 120 receives a camera switching instruction from a user by pointing device 140, camera control information transmitting/receiving section 124 inquires photographing direction zoom magnification control equipment 110 connected to the cameras about the current zoom magnification of the camera instructed by the user (step S301). Upon receiving the current zoom magnification of the camera from photographing direction zoom magnification control equipment 110, camera control information transmitting/receiving section 124 makes this zoom magnification to store in zoom magnification storage section 126 (step S302) upon completing storage of the zoom magnification, zoom magnification storage section 126 informs zoom magnification adjustment section 125 that storage is complete. Zoom magnification adjustment section 125 then sends a zoom magnification adjustment instruction to photographing direction zoom magnification control equipment 110 connected to the camera via camera control information transmitting/receiving section 124 so as to put the zoom magnification of the camera from the zoom magnification stored in zoom magnification storage section 126 to the widest angle zoom magnification at the point where storage of zoom magnification from zoom magnification storage section 126 is complete (step S303). Here, the widest angle zoom magnification is such that, for example, zoom magnification adjustment section 125 stores the operating range for the zoom magnification of the camera in advance during installation of the cameras, or camera control information transmitting/receiving section 124 acquires the operation range of the zoom magnification of the camera at the same time in addition to the current zoom magnification of the camera from photographing direction zoom magnification control equipment 110 as a response to the inquiry to the cameras about the zoom magnification. When photographing direction zoom magnification control equipment 110 completes adjustment of the zoom magnification of the camera designated by camera control information transmitting/receiving section 124, photographing direction zoom magnification control equipment 110 connected to the camera reports camera control information transmitting/receiving section 124 that adjustment of the zoom magnification is complete. Upon receiving report of zoom magnification adjustment completion of the camera, camera control information transmitting/receiving section 124 instructs camera image switching section 121 to switch over of the camera image (step S304). At this time, the image displayed at monitor 130 via image display section 122 is switched over to the image designated by the user. Upon completing switching over of the images, camera image switching section 121 reports zoom magnification adjustment section 125 that image switching is complete. Upon receiving report that switching over of the images is complete from camera image switching section 121, zoom magnification adjustment section 125 inquires about the zoom magnification prior to the widening of the camera zoom magnification stored in zoom magnification storage section 126. Zoom magnification adjustment section 125 controls the camera via camera control information transmitting/receiving section 124 in such a manner that the zoom magnification of the camera photographing at the widest angle zoom magnification is changed to the zoom magnification before making the angle wide (step S305). Namely, zoom magnification adjustment section 125 sends a control signal to photographing direction zoom magnification control equipment 110 connected to the camera after switching via camera control information transmitting/receiving section 124 in such a manner that the zoom magnification of the camera after switching returns to the zoom magnification stored in zoom magnification storage section 126 by camera control information transmitting/receiving section 124 in step S302.

As a result of this flow, camera control apparatus 120 is capable of controlling the zoom magnification of the cameras instructed to be switched over to at the time switching of a camera image is instructed by a user.

In the description in FIG. 8, a description is given where the zoom magnification adjusted by zoom magnification adjustment section 125 is taken to be at the widest angle but the present invention is not limited to this. Namely, zoom magnification adjustment section 125 only has to change the zoom magnification by just a predetermined range to a wide angle, i.e. to a low magnification to the extent that the user intuitively understands the photographing direction and zoom magnification of the camera and where the image for the camera is being photographed for simply by looking at the image of the camera after switching over.

Namely, if camera control instruction receiving section 123 receives a switching instruction for cameras 100a to 100n from a user, camera control information transmitting/receiving section 124 acquires the current zoom magnification for the camera instructed to be switched over to, and zoom magnification storage section 126 stores the zoom magnification for the camera acquired by camera control information transmitting/receiving section 124. Zoom magnification adjustment section 125 then changes the zoom magnification of the camera instructed to be switched over to from the zoom magnification of the camera stored by zoom magnification storage section 126 to a wide angle state, i.e. to a desired zoom magnification lower than the stored zoom magnification. If the camera image is switched over at camera image switching section 121, zoom magnification adjustment section 125 returns the zoom magnification of the camera changed to a wide angle to the zoom magnification stored by zoom magnification storage section 126. As a result, it is possible for the user to intuitively understand the photographing direction and zoom magnification of the camera simply by looking at the camera image after switching, and in the event of changing to a predetermined photographing direction and zoom rate, it is possible to start control of the camera immediately.

FIG. 9 shows an example of a screen displayed at monitor 130 when camera control apparatus 120 of this embodiment switches over camera images. Here, FIG. 9A is an example screen of monitor 130 before camera image switching is instructed by a user. First, as shown in FIG. 9B, the user designates camera image switching by clicking icon 401 that displays the installation position of she camera displaying the desired image by pointing device 140. By the camera designation of the user, camera control apparatus 120 then controls zoom magnification of the camera designated by the user with the flow described above FIG. 9C shows a display example of a camera image at the time of switching the camera image in step S304 of FIG. 8. At this time, an image of the camera designated by the user in FIG. 9B is displayed at monitor 130 but the zoom magnification of the camera is adjusted to be photographed at the widest angle. After this, as with the example screen shown in FIG. 9D, the magnification of the camera image taken at the widest angle shown in FIG. 9C is zoomed up, and the zoom magnification state of the camera is returned to the zoom magnification when the user instructs switching of the camera. Namely, the zoom magnification is returned to the zoom magnification stored by zoom magnification storage section 126 as shown in step S302 of FIG. 8.

As a result, the user can intuitively determine the photographing direction and zoom magnification the camera instructed to be switched over to is photographing in from the camera image.

As the user can intuitively understand the photographing position of the camera after switching simply by looking at the image, zoom magnification adjustment section 125 can adjust the speed for changing the zoom magnification based on the frame rate of the camera image displayed at monitor 130. Namely, zoom magnification adjustment section 125 may be adjusted to show smooth movement of zoom magnification adjustment from FIG. 9C to FIG. 9D. The configuration of camera control apparatus 120 in this case is the configuration shown in FIG. 10.

Figure 10:
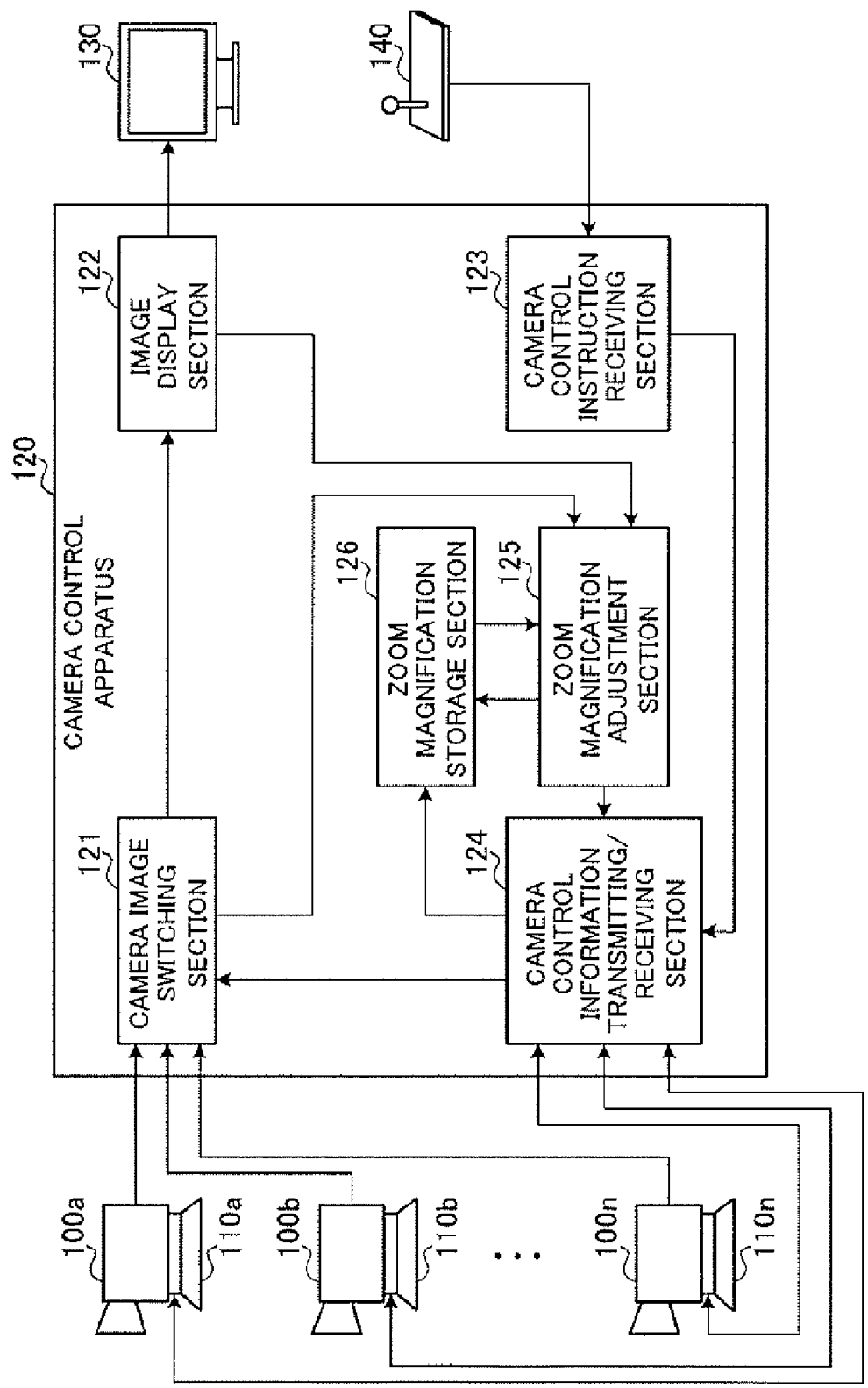
FIG. 10 shows a configuration of a camera control apparatus changing the speed of change of zoom magnification according to Embodiment 1 of the present invention.

The configuration of camera control apparatus 120 shown in FIG. 10 is for transmitting frame rate information of the image displayed by image display section 122 of camera control apparatus 120 shown in FIG. 6 to zoom magnification adjustment section 125 and other aspects of the configuration are the same as for the configuration of FIG. 6. In FIG. 10, camera image switching section 121 reports zoom magnification adjustment section 125 of image frames being received from cameras 100a to 100n and zoom magnification adjustment section 125 acquires frame rate information from image frames received from camera image switching section 121. Further, in the event that image data received by camera image switching section 121 cannot all be displayed according to the processing capability of camera control apparatus 120, frame rate Information displayed by image display section 122 is sent to zoom magnification adjustment section 125, and zoom magnification adjustment section 125 may then acquire the frame rate information received from image display section 122. In either case, the processing method for adjusting the change in speed of the zoom magnification by zoom magnification adjustment section 125 referring to the frame rate of the image displayed at monitor 130 does not change.

Next, an example is described where zoom magnification adjustment section 125 changes the speed for adjusting the zoom magnification by referring to the frame rate of the image displayed at monitor 130.

The frame rate of the image received by camera image switching section 121 or the frame rate of the image displayed by image display section 122 at monitor 130 is taken to be Nfps. Here, fps is an abbreviation of frames per second, and is the number of image frames that can be displayed in one second. Further, here, the speed for changing the zoom magnification for the camera by zoom magnification adjustment section 125 is different according to whether the user looking at the image wants to operate the camera soon or whether the user wants to observe the adjustment of the zoom magnification more smoothly. In Embodiment 1, however, a description is given where the zoom magnification is increased M times every time the image frame changes so as to realize smooth movement. In this event, the value of M is taken to be already in the possession of zoom magnification adjustment section 12S. Zoom magnification adjustment section 125 then sets a speed K (times per second) for making the zoom magnification of the camera change to the following equation (1), and adjusts the speed for changing the zoom.

$K = N \times M$      [Equation 1]

As a result, an image where the zoom magnification changes more smoothly can be provided to the user so that the photographing position, photographing direction and zoom magnification of the camera can be understood more intuitively.

While switching over cameras, camera control apparatus 120 may also show the user that the camera is being automatically controlled after switching. Camera control apparatus 120 in this case adopts the configuration shown in FIG. 11.

Figure 11:
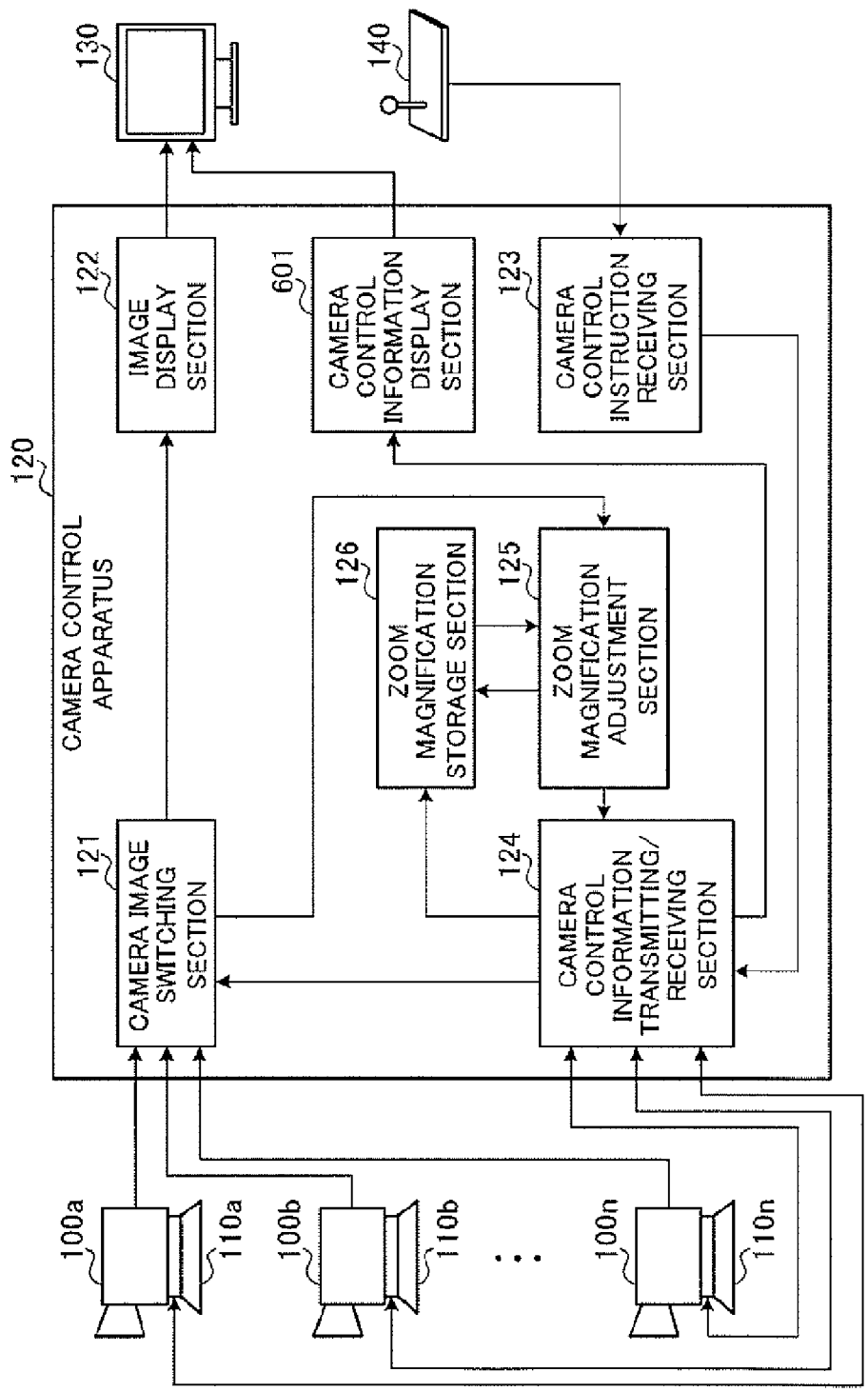
FIG. 11 is a block view showing a configuration for camera control apparatus displaying a control state of a camera according to Embodiment 1 of the present invention.

The configuration of camera control apparatus 120 shown in FIG. 11 is the configuration of camera control apparatus 120 shown in FIG. 6 with camera control information display section 601 added, with other aspects of the configuration being the same as for the configuration of FIG. 6. In FIG. 11, after camera control information transmitting/receiving section 124 instructs switching over of the image to camera image switching section 121, camera control information display section 601 displays that the zoom magnification of the camera after switching has been returned to the zoom magnification stored by zoom magnification storage section 126 at monitor 130 via camera control information transmitting/receiving section 124. This example is shown in FIG. 12.

Figure 12:
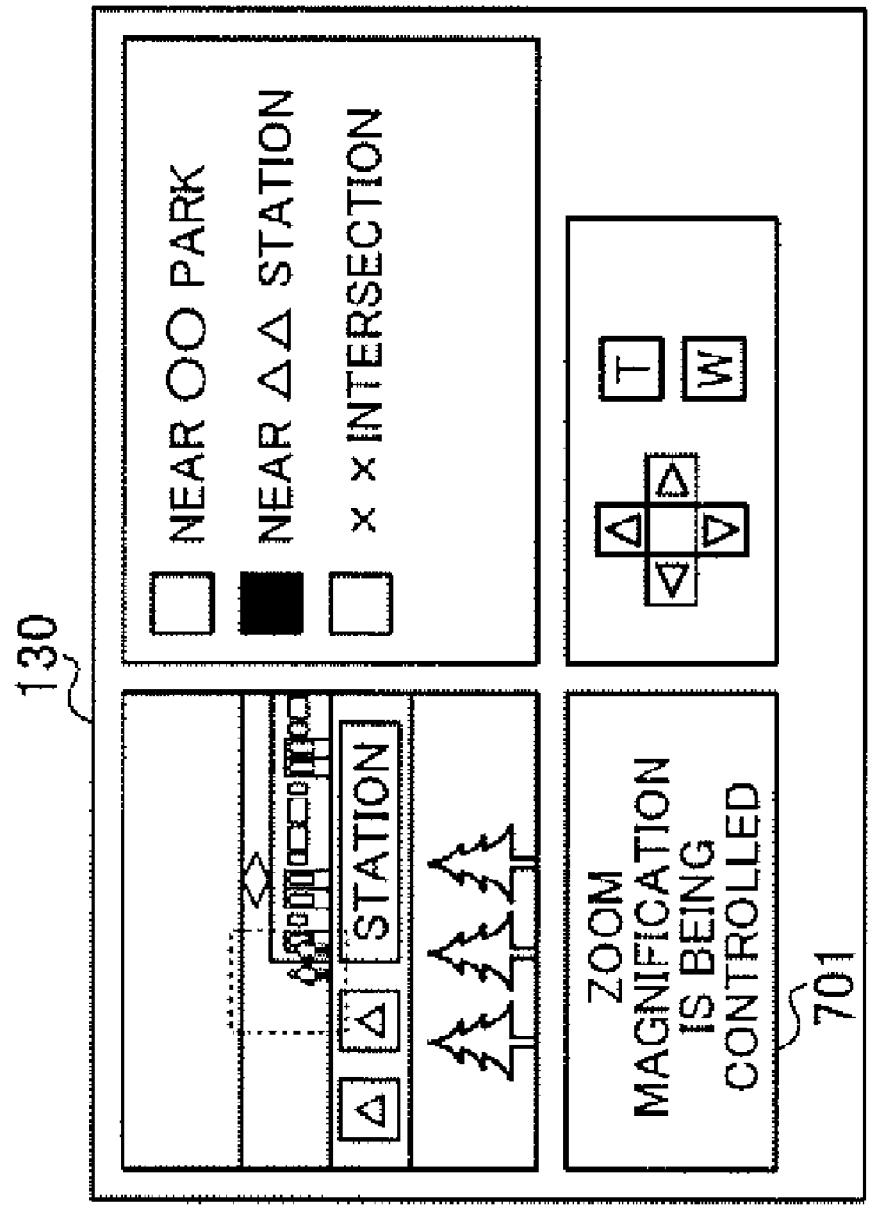
FIG. 12 shows a display example of a message displayed by a camera control apparatus according to Embodiment 1 of the present invention.

In FIG. 12, for example, message 701 to the effect of "zoom magnification is being controlled" is displayed at monitor 130 indicating that zoom magnification of the camera after switching by camera control apparatus 120 is being changed. The method and location for displaying the message is not limited to that described here, and any method may be possible if the display is shown in such a manner that the user can understand that the zoom magnification of the camera after switching is being moved automatically without the intervention of the user.

As described above, according to Embodiment 1, in the event that a user switches over a camera image to be displayed, it is possible for the user to intuitively understand the installation position, photographing direction and zoom magnification of the camera simply by looking at the image as a result of zoom magnification adjustment section 125 returning zoom magnification of the camera from the widest angle to the zoom magnification when the user selects the camera image.

In Embodiment 1, a description is given where the zoom magnification adjusted by zoom magnification adjustment section 125 is taken to be at the widest angle but the present invention is not limited to this. Namely zoom magnification adjustment section 125 therefore only has to change the zoom magnification to a wide angle, i.e. to a low magnification to the extent that the user intuitively understands the photographing direction and zoom magnification of the camera simply by looking at the image of the camera and where the image for the camera is being photographed after switching.

In this way, according to Embodiment 1, zoom magnification adjustment section 125 changes the zoom magnification of the camera to a zoom magnification of an angle wider than the magnification stored in storage section 126, i.e. to a reference magnification lower than the stored zoom magnification before switching to the image of the camera instructed to be switched over to by the user by camera image switching section 121. After switching over camera image, as a result of zoom magnification adjustment section 125 returning the zoom magnification of the camera from the reference magnification to the zoom magnification stored by zoom magnification storage section 126, it is possible for a user to intuitively understand the photographing direction and zoom magnification of the camera by looking at the image, and a so to start control of the camera immediately in the event of chancing to a desired photographing direction and zoom magnification.

EMBODIMENT 2

Figure 13:
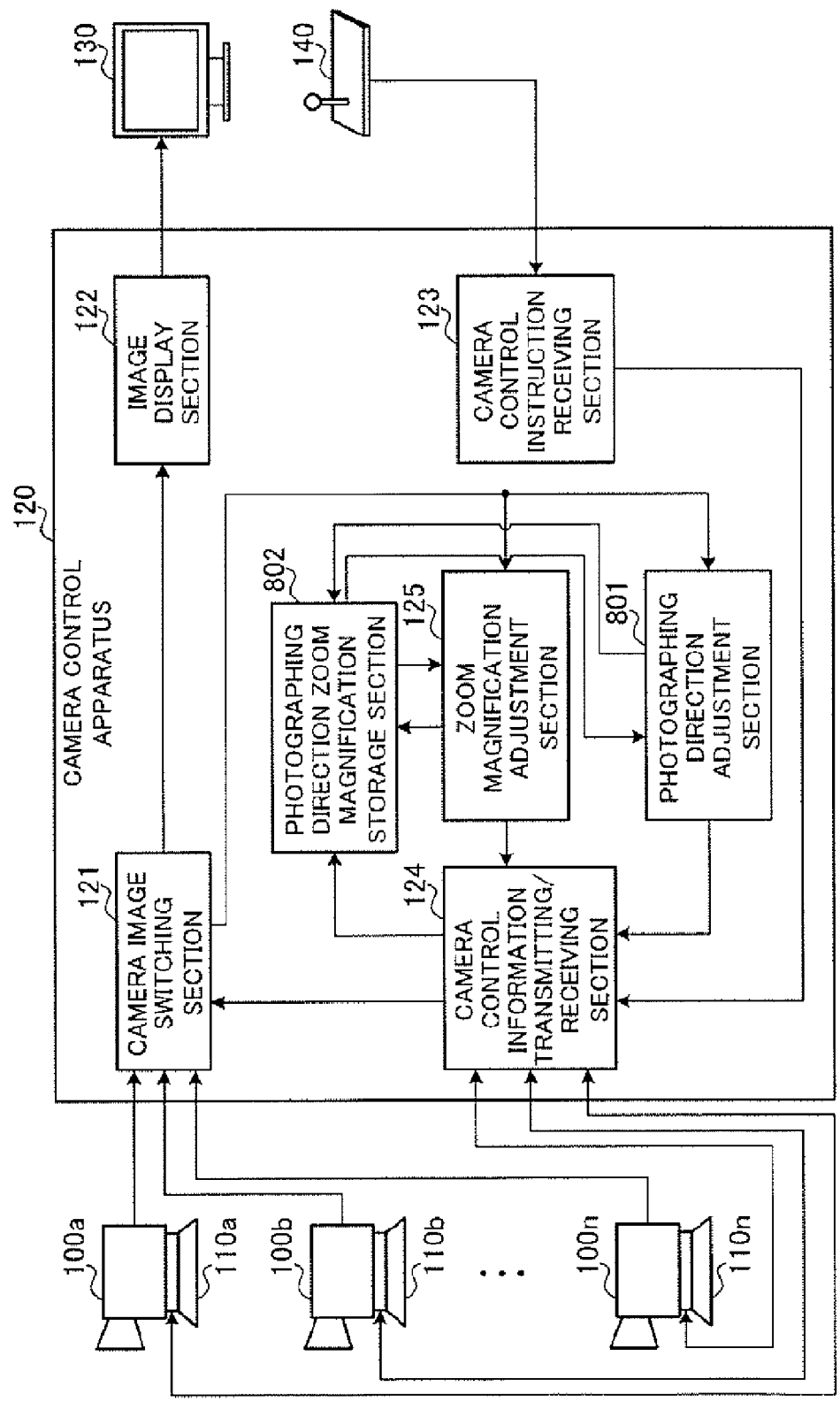
FIG. 13 is a block view showing a configuration of a camera control apparatus according to Embodiment 2 of the present invention.

A configuration view of camera control apparatus 120 of Embodiment 2 of the present invention is shown in FIG. 13. Camera control apparatus 120 of FIG. 13 has also added photographing direction adjustment section 801 enabling control of photographing direction to camera control apparatus 120 of FIG. 6 in addition to the zoom magnification of the camera, and has photographing direction zoom magnification storage section 802 capable of also storing photographing direction in addition to camera zoom magnification instead of zoom magnification storage section 126. Other components are the same as for camera control apparatus 120 of Embodiment 1 shown in FIG. 6 so that the same components are assigned the same reference numerals, and the detailed descriptions thereof will be omitted. Further, the configuration of the screen displayed at monitor 130 is also the same as for Embodiment 1.

Next, a description is given of the flow of the camera control operation of camera control apparatus 120 of this embodiment. In this embodiment, when the user selects a camera and switches over images, the zoom magnification of she camera after switching, i.e. the camera the user has instructed to be switched over to, is stored, and the operation of zoom magnification adjustment section 125 changing zoom magnification of the camera from the stored zoom magnification to the zoom magnification capable of Photographing at the widest angle is the same as for Embodiment 1. Namely, when camera control instruction receiving section 123 receives a camera switching instruction from a user, camera control information transmitting/receiving section 124 inquires photographing direction zoom magnification control equipments 110a to 110n connected to cameras 100a to 100n about the current zoom magnification of the camera instructed by the user. Camera control information transmitting/receiving section 124 then receives this zoom magnification and stores this in photographing direction zoom magnification storage section 802. Photographing direction zoom magnification storage section 802 then stores the zoom magnification received from camera control information transmitting/receiving section 124. After photographing direction zoom magnification storage section 802 completes storage of the zoom magnification, zoom magnification adjustment section 125 changes the zoom magnification of the camera instructed to be switched over to by the user from the stored zoom magnification to the widest angle zoom magnification, and controls the zoom magnification of this camera via camera control information transmitting/receiving section 124. The flow of this operation corresponds to step S301 to step S303 of FIG. 8. After zoom magnification adjustment section 125 changes zoom magnification of the camera after switching, i.e. the camera instructed to be switched over to by the user, from the stored zoom magnification to a zoom magnification capable of the widest angle photographing, photographing direction adjustment section 801 automatically controls the photographing direction of the camera before switching to be as close as possible to the photographing position and photographing range of the camera after switching, i.e. the camera that received switching instructions from the user. Now, a detailed description is given of a method for controlling photographing direction of the camera before switching, along the flow shown in FIG. 14.

First, after zoom magnification adjustment section 125 changes zoom magnification of the camera after switching, i.e. the camera instructed to be switched over to by the user, from the stored zoom magnification to a zoom magnification capable of the widest angle photographing, camera control information transmitting/receiving section 124 inquires photographing direction zoom magnification control equipment 110 connected to the camera about the photographing direction, field angle, and focus distance of the camera after switching where the zoom magnification is changed to the widest angle (step S901). Here, photographing direction represents the pan and tilt angle of the camera. Further, field angle is a value obtained from individual performances and zoom magnification of the camera. Upon receiving information for pan and tilt angle, field angle, and focus distance, camera control information transmitting/receiving section 124 stores this information in photographing direction zoom magnification storage section 802 (step S902). If photographing direction zoom magnification storage section 802 has completed storage of information for the pan and tilt angle, the field angle and focus distance, photographing direction adjustment section 801 calculates the direction and field angle the camera before switching is to be rotated by from information for the pan and tilt angle, field angle and focus distance stored by photographing direction zoom magnification storage section 802 and the installation position of the camera before switching (step S903). Here, the installation position of the camera before switching is stored in photographing direction adjustment section 801 at the time the camera before switching is installed, or photographing direction zoom magnification control equipments 100a to 100n of the individual cameras 100a to 100n may store installation positions in advance, so that, for example, camera control information transmitting/receiving section 124 separately inquires and acquires the installation positions from cameras 100a to loon before switching when camera image instruction is given from a user.

Figure 1:
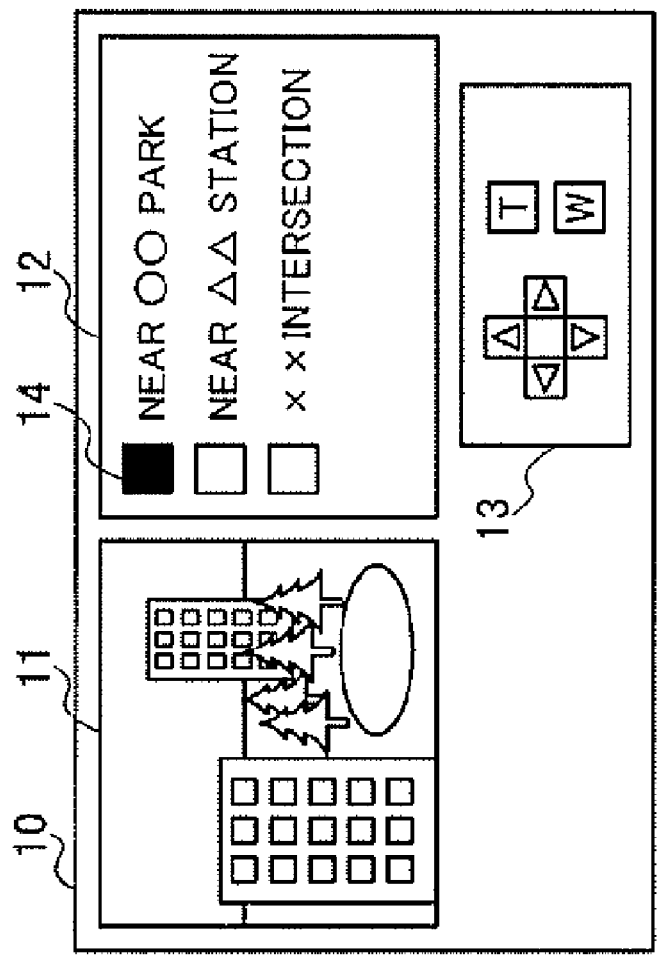
FIG. 1 shows a display example of a screen displaying a camera control apparatus of the related art.
Figure 2:
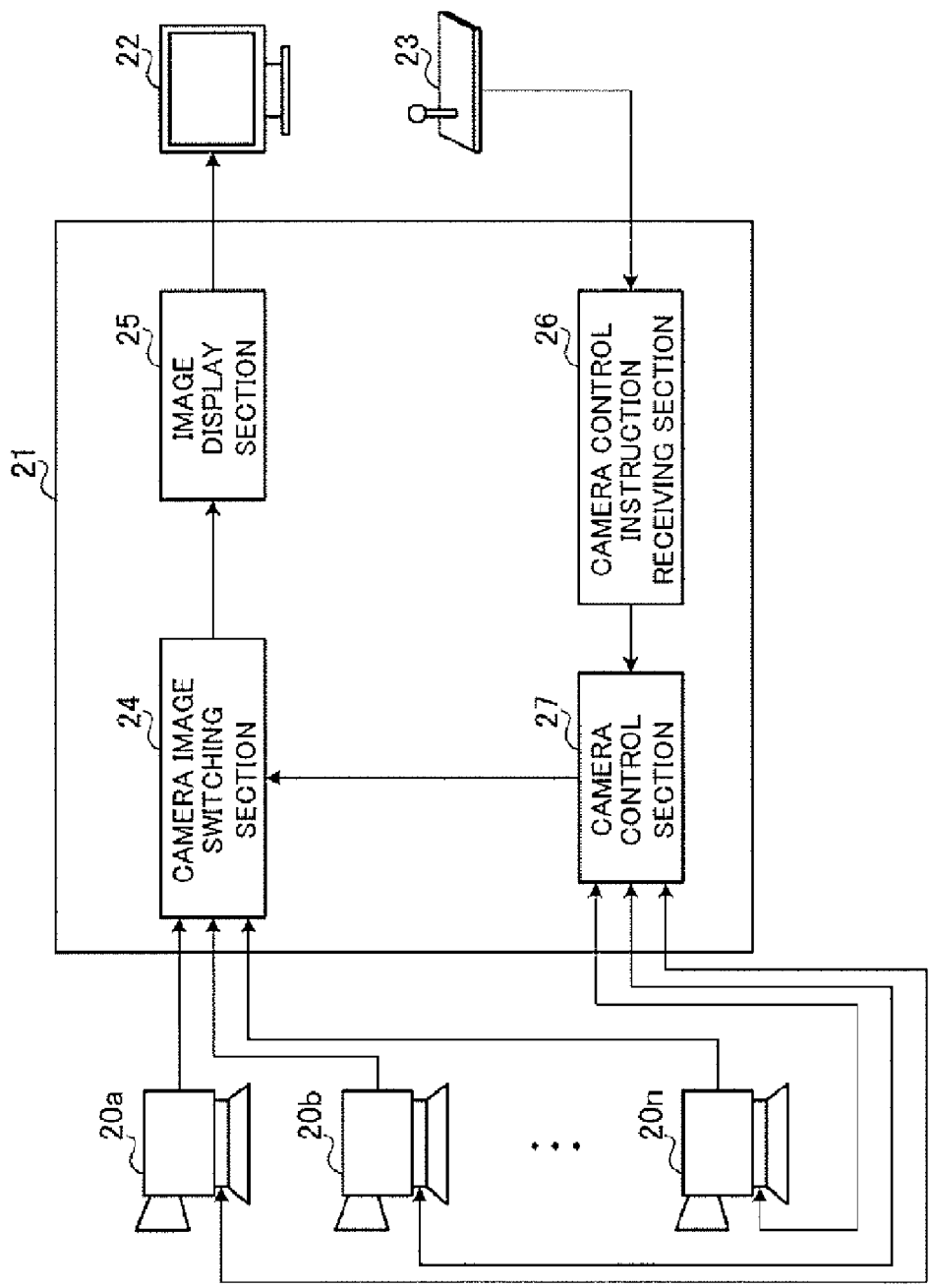
FIG. 2 is a block view showing a configuration or a camera control apparatus of the related art.
Figure 3:
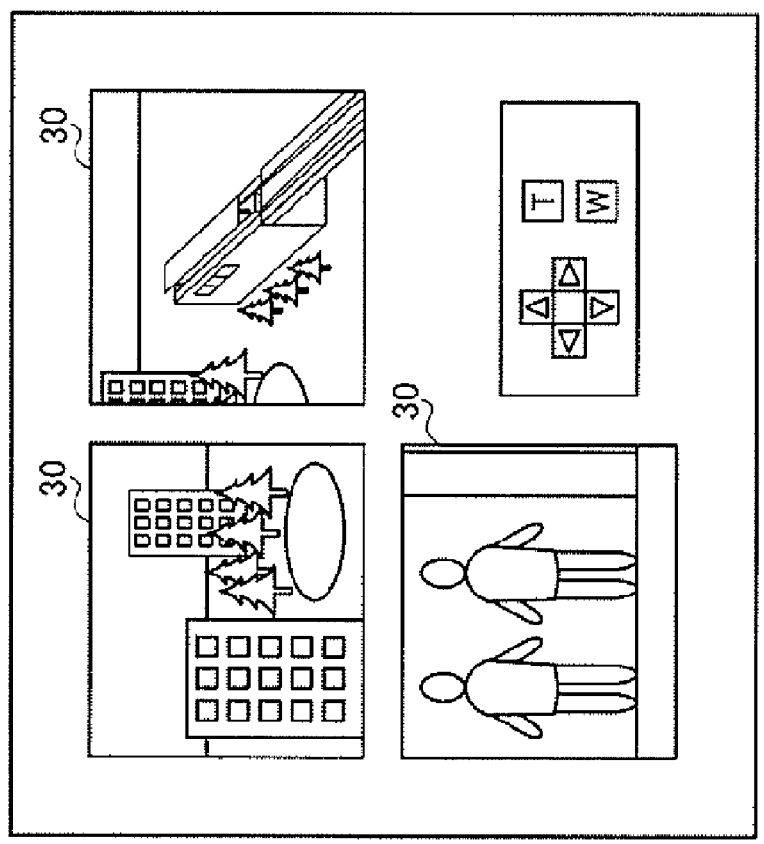
FIG. 3 shows a display example of a plurality of screens displayed at the same time by camera control apparatus of the related art.
Figure 4:
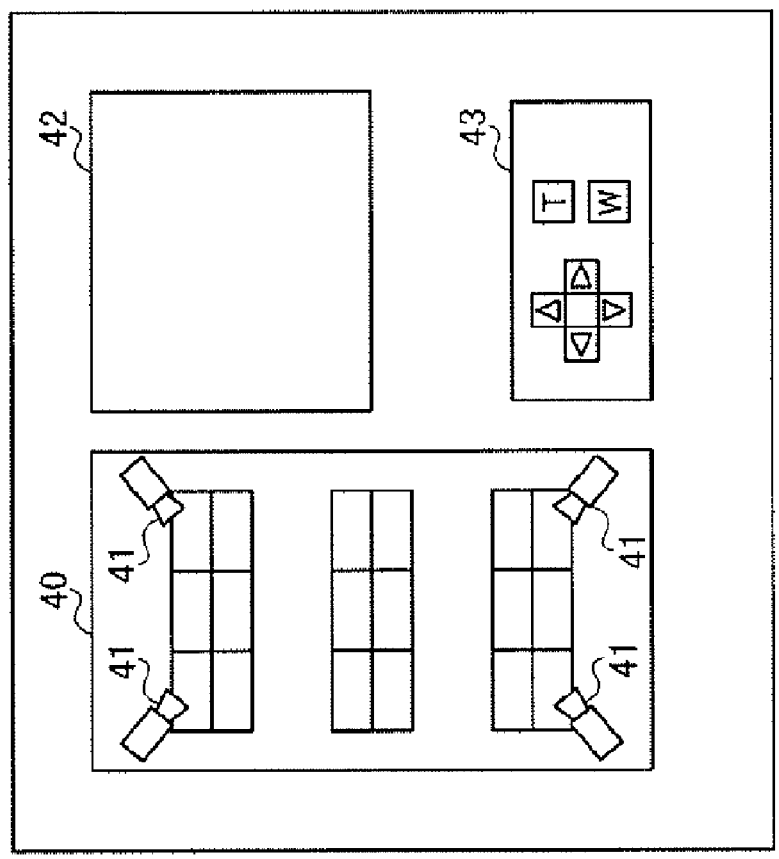
FIG. 4 shows a display example where a camera control apparatus of the related art displays camera images and camera installation positions at the same time.
Figure 5:
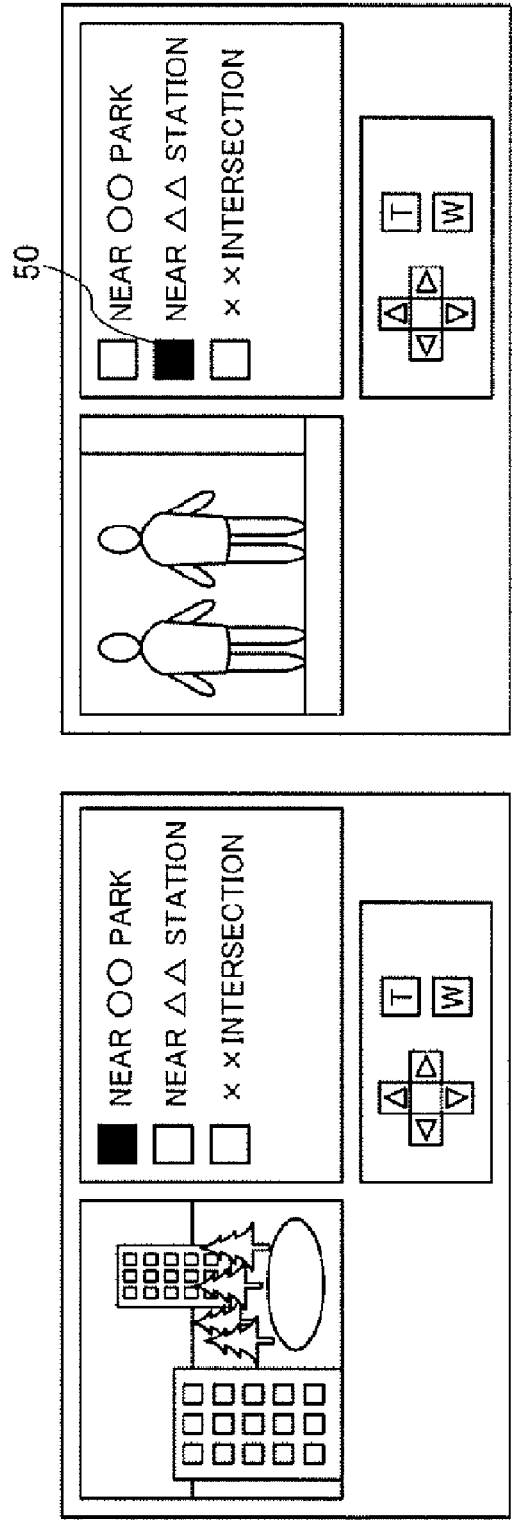
FIG. 5 shows display examples of a screen for before and after camera switching at a camera control apparatus of the related art.

Next, a description is given using FIG. 1A and FIG. 51 of a method for calculating direction for a camera to be rotated and field angle of a camera before switching. FIG. 15A and FIG. 15B show coordinates for cameras before switching and for cameras after switching in the same coordinate plane as viewed from mid-air towards ground. In FIG. 15A, the pan angle of camera 1001 before switching is taken to be 1003, and the pan angle of camera 1002 after switching is taken to be 1004. Further, a focal point of camera 1002 after switching is taken to be 1005. Camera control information transmitting/receiving section 124 has already obtained the coordinates of camera 1001 before switching, the coordinates of camera 1002 after switching, and angle of rotation 1004 of camera 1002 after switching in processing up to this point (step S902 of FIG. 14). Here, coordinates of camera 1001 before switching are taken to be $(x_1, y_1)$ coordinates of camera 1002 after switching are taken to be $(x_2, y_2)$, and rotational angle 1004 of the camera after switching is taken to be $\theta_2$. At this time, photographing direction adjustment section 801 controls the photographing direction of camera 1001 before switching in such a manner that the photographing direction of camera 1001 before switching faces focal point 1005 of camera 1002.

Figure 14:
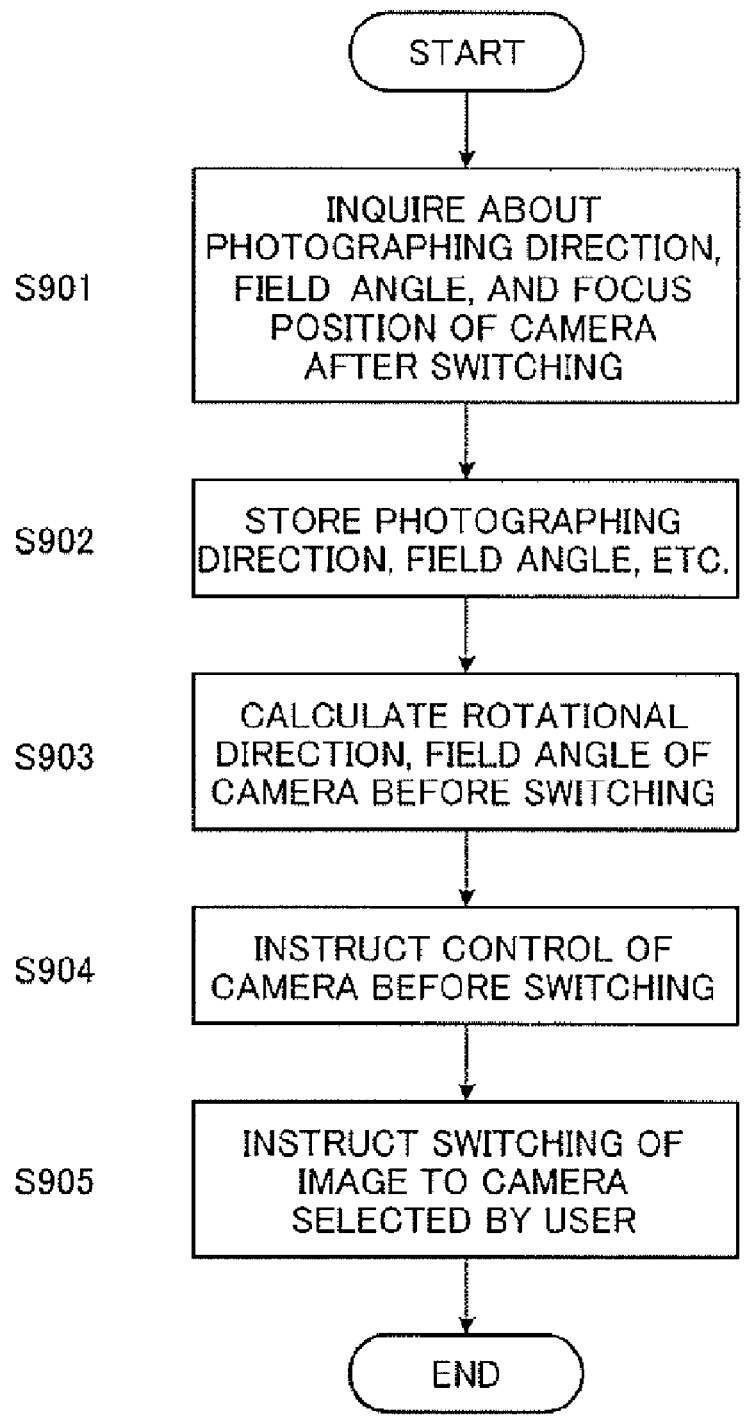
FIG. 14 is a flow chart showing the flow of a camera control operation of a camera control apparatus according to Embodiment 2 of the present invention.
Figures 15A, 15B:
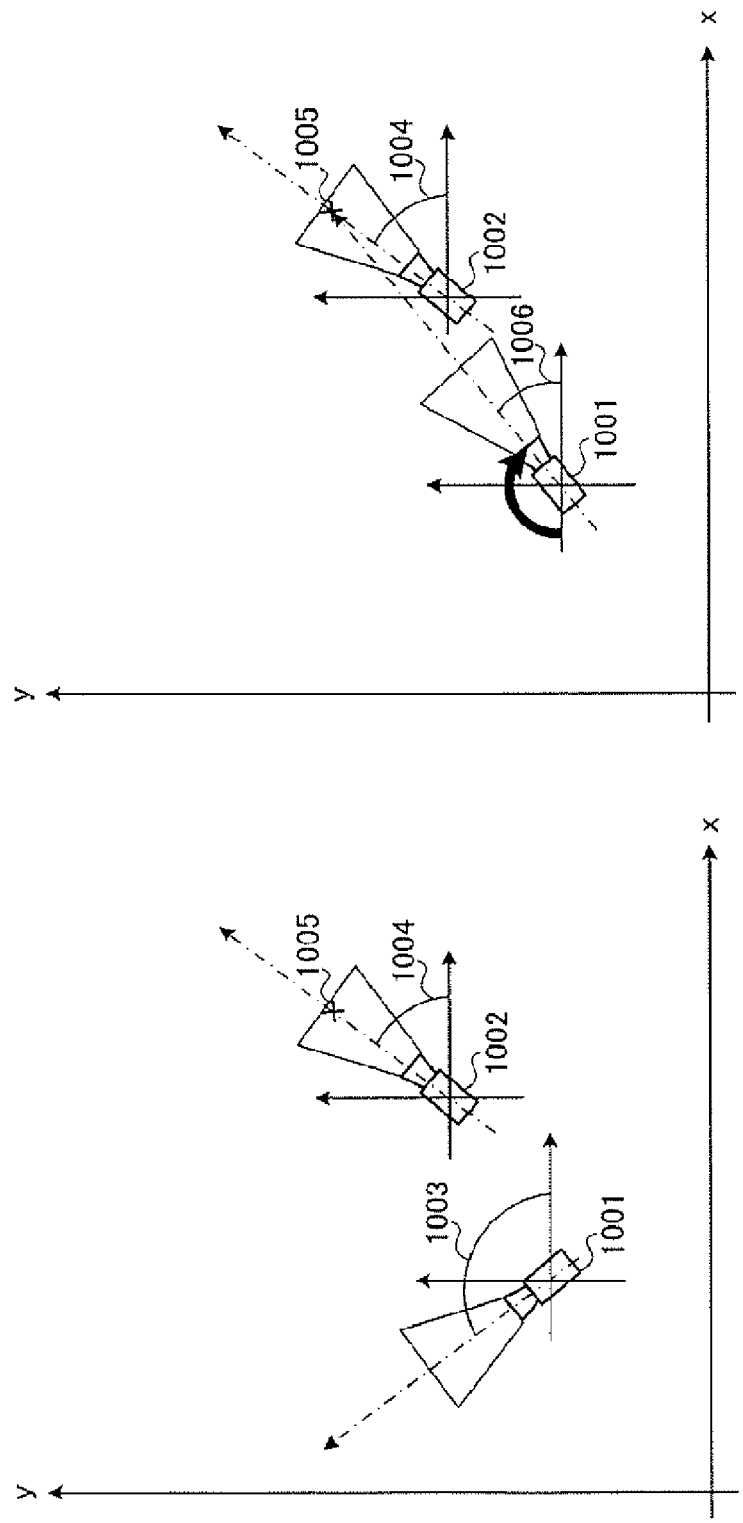
FIG. 15 shows directions of rotation of a camera of a camera control apparatus according to Embodiment 2 of the present invention.

The distance from camera 1002 after switching to focal point 1004 of camera 1002 after switching has already been obtained by camera control information transmitting/receiving section 124 in step S902 of FIG. 14. When the distance is taken to be d, coordinates $(x_{2f}, y_{2f})$ of focal point 1005 of camera 1002 after switching can be expressed respectively by the following equation (2).

[Equation 2]

$$x_{2f} = d\cos\theta_2 + x_2$$

$$y_{2f} = d\sin\theta_2 + y_2 \quad (2)$$

As a result, as shown in FIG. 15B, when the angle to give photographing direction 1006 for camera 1001 before switching to photograph in the direction of focal point 1005 of camera 1002 after switching is taken to be $\theta_{1f}$, this can be expressed as the following equation (3).

[Equation 3]

$$\theta_{1f} = \tan^{-1}\frac{y_{2f} - y_1}{x_{2f} - x_1} \quad (3)$$

Photographing direction adjustment section 801 then controls the photographing direction of camera 1001 before switching via camera control information transmitting/receiving section 124 in such a manner that the photographing direction of camera 1001 before switching becomes the angle $\theta_{1f}$. As a result, the photographing direction of the camera before switching is therefore close to the photographing direction of the camera after switching, i.e. close to the image of the camera after switching. Therefore, in the event that the camera is switched over to, a sense of discomfort felt by a user at the time of looking at an image after switching can be reduced, and it is possible for the user to intuitively understand the photographing position and photographing direction of the camera just by looking at this image.

Figure 16:
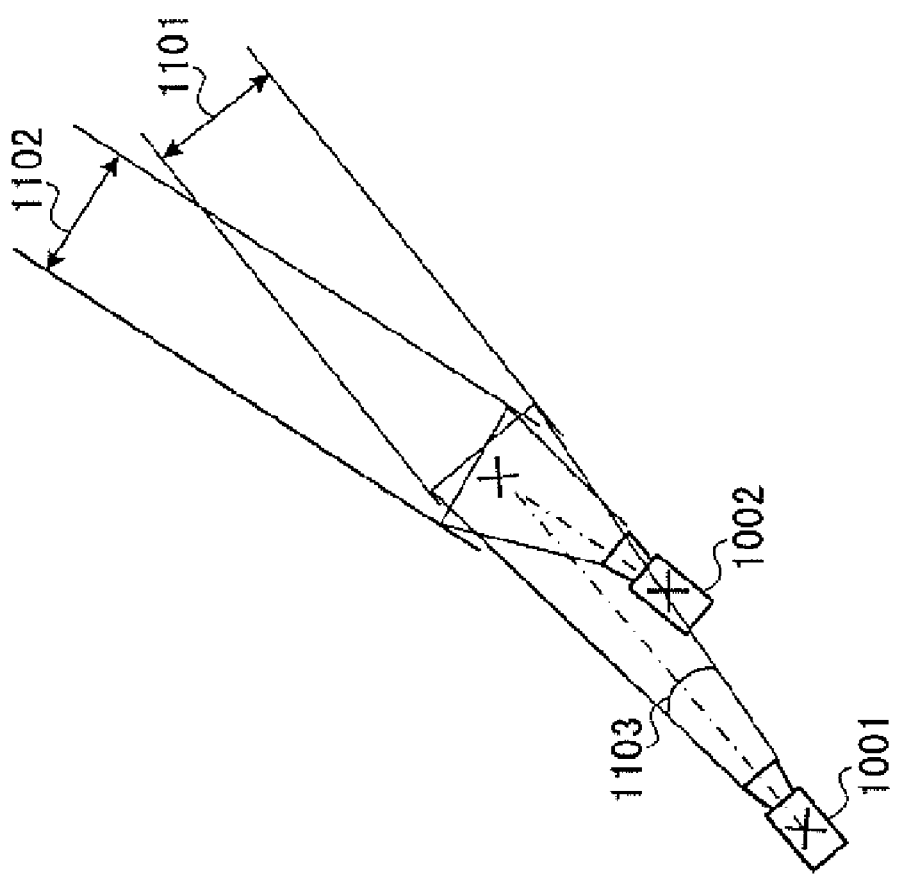
FIG. 16 illustrates a method for calculating zoom magnification of a camera of a camera control apparatus according to Embodiment 2 of the present invention.

Next, a method for calculating field angle of a camera before switching is shown in FIG. 16. As shown in FIG. 16, field angle 1103 of camera 1001 before switching is adjusted in such a manner that photographing range 1102 of camera 1002 after switching at the time where camera 1001 before switching and camera 1002 after switching are photographing the same point and photographing range 1101 of camera 1001 before switching become the same length. Field angle $\theta_{2g}$ of camera 1002 after switching has already been acquired by camera control information transmitting/receiving section 124 (step S902 of FIG. 14), and length len of photographing range 1102 of the camera after switching can be expressed by the following equation (4).

[Equation 4]

$$len = 2d \tan\frac{\theta_{2g}}{2} \quad (4)$$

As a result, field angle $\theta_{1g}$ of camera 1001 before switching is given by the following equation (5).

[Equation 5]

$$\theta_{1g} = \tan^{-1}\frac{len/2}{\sqrt{(x_{2f}-x_1)^2+(y_{2f}-y_1)^2}} \quad (5)$$

Next, equation (4) is substituted in equation (5) to give the following equation (6).

[Equation 6]

$$\theta_{1g} = \tan^{-1}\frac{d\tan\frac{\theta_{2g}}{2}}{\sqrt{(x_{2f}-x_1)^2+(y_{2f}-y_1)^2}} \quad (6)$$

Photographing direction adjustment section 801 adjusts the field angle of camera 1001 before switching to $\theta_{1g}$ expressed by the above equation (6). As a result, the magnification of the camera before switching is therefore close to the magnification of the camera after switching, i.e. close to the photographing range of the camera after switching. Therefore, in the event that the camera is switched, a sense of discomfort felt by a user at the time of looking at an image after switching can be reduced, and it is possible for the user to intuitively understand the photographing position, photographing direction, and photographing range etc. of the camera just by looking at this image after switching.

In this embodiment, a description is given of a method for calculating an angle component of pan (horizontal direction) of a photographing direction of camera 1001 before switching, but it is also possible to use a view where the camera before switching and the camera after switching are viewed from right beside in a horizontal direction and calculate an angle component (vertical direction) for tilt in a photographing direction of the camera before switching.

Photographing direction adjustment section 801 controls the camera before switching via camera control information transmitting/receiving section 124 in such a manner as to give the camera photographing direction and zoom magnification of the camera before switching calculated from the flow described above (step S904). Upon receiving report that camera control is complete is received from the camera before switching, camera control information transmitting/receiving section 124 instructs switching of the image displayed at monitor 130 to camera image switching section 121 (step S905). After this, the flow for returning the zoom magnification of the camera after switching, i.e. returning to the zoom magnification stored in photographing direction zoom magnification storage section 802 is the same as for the case in Embodiment 1. This corresponds to step S305 in the drawings of the flow of FIG. 8.

In the above, at the time the camera image the user wants to see is selected, camera control apparatus 120 automatically controls the camera photographing the image before switching and the camera after switching over designated by the user.

FIG. 17 is a view showing a display example of an image displayed at monitor 130 when the camera before switching and the camera after switching are controlled respectively in this embodiment.

Figure 18:
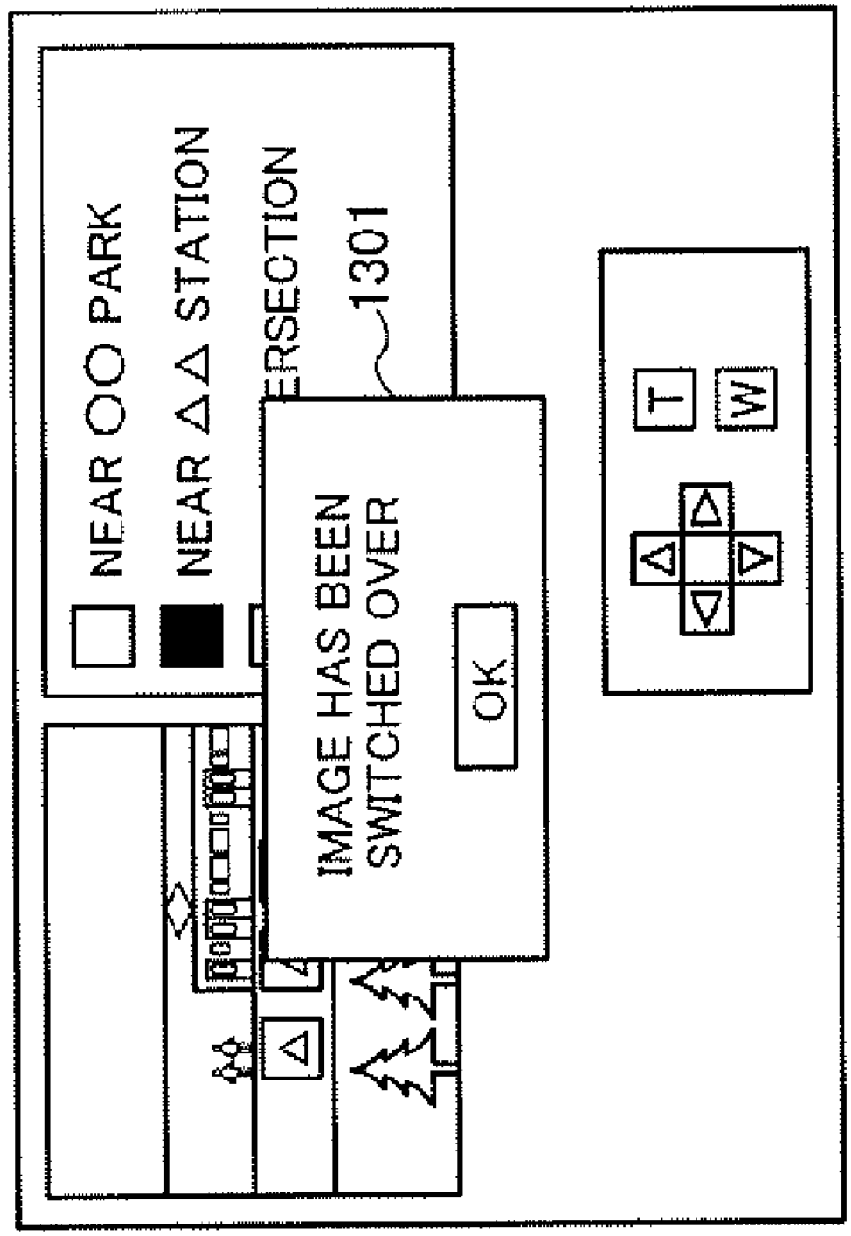
FIG. 18 shows a display example of a message when an image of a camera control apparatus according to Embodiment 2 of the present invention is changed over.

A camera image before switching is displayed in FIG. 17A. When a user clicks icon 1201 in order to switch over camera images, the screen goes from this state to the screen 1202 shown in FIG. 17B. At this time, a description is given using step S901 to step S905 of FIG. 14 where the image is not switched over to the selected camera but photographing direction adjustment section 801 changes the photographing direction and zoom magnification in such a manner that the camera photographing images displayed up to this point, i.e. the camera before switching is as close as possible to the field of view of the camera after switching. When control of the camera before switching is complete, as shown in FIG. 17C, the image of the camera designated by the user is switched over to. At this point, the field of view of the image of the camera before switching and the field of view of the image of the camera after switching are similar. Therefore, as shown in FIG. 18, switching of the camera may be proposed to the user by a pop-up window by displaying, for example, message 1301 to the effect of "the image has been switched". After switching of the images, as shown in FIG. 17D, the operation of controlling the cameras before switching and after switching is completed by returning the zoom magnification to the original magnification.

When a user instructs switching of cameras, photographing direction zoom magnification storage section 802 may store the photographing direction and zoom magnification of a camera before switching, so that after completion of switching of the camera, photographing direction adjustment section 901 returns the photographing direction and zoom magnification of the camera before switching to the original photographing direction and zoom magnification stored in photographing direction zoom magnification storage section 802.

Further, in this embodiment, a description is given of a camera control method for controlling the photographing direction in such a manner that the camera before switching becomes close to the field of view of the camera after switching when the user instructs switching over of the image, but the same results can be obtained by having the camera before switching and the camera after switching move in a manner opposite to that described above. Namely, if the user instructs switching of the image of the camera, photographing direction adjustment section 801 performs control in such a manner that the photographing direction and zoom magnification for the camera after switching photographs in the same direction as the camera before switching, and gives a similar field of view. After this, if camera image switching section 121 switches the image displayed at monitor 130 over to the image of the camera after switching, photographing direction adjustment section 801 returns the field of view of the camera after switching to the photographing direction and zoom magnification stored by photographing direction zoom magnification storage section 802.

The configuration of the camera control apparatus in this case is substantially the same as the configuration of camera control apparatus 120 of FIG. 8, but differs in that photographing direction zoom magnification storage section 802 stores photographing direction of the camera before switching, zoom magnification and focus distance, and photographing direction and zoom magnification of the camera after switching, and photographing direction adjustment section 801 operates for controlling in such a manner that the field of view of the camera after switching matches with the field of view of the camera before switching.

Figure 19:
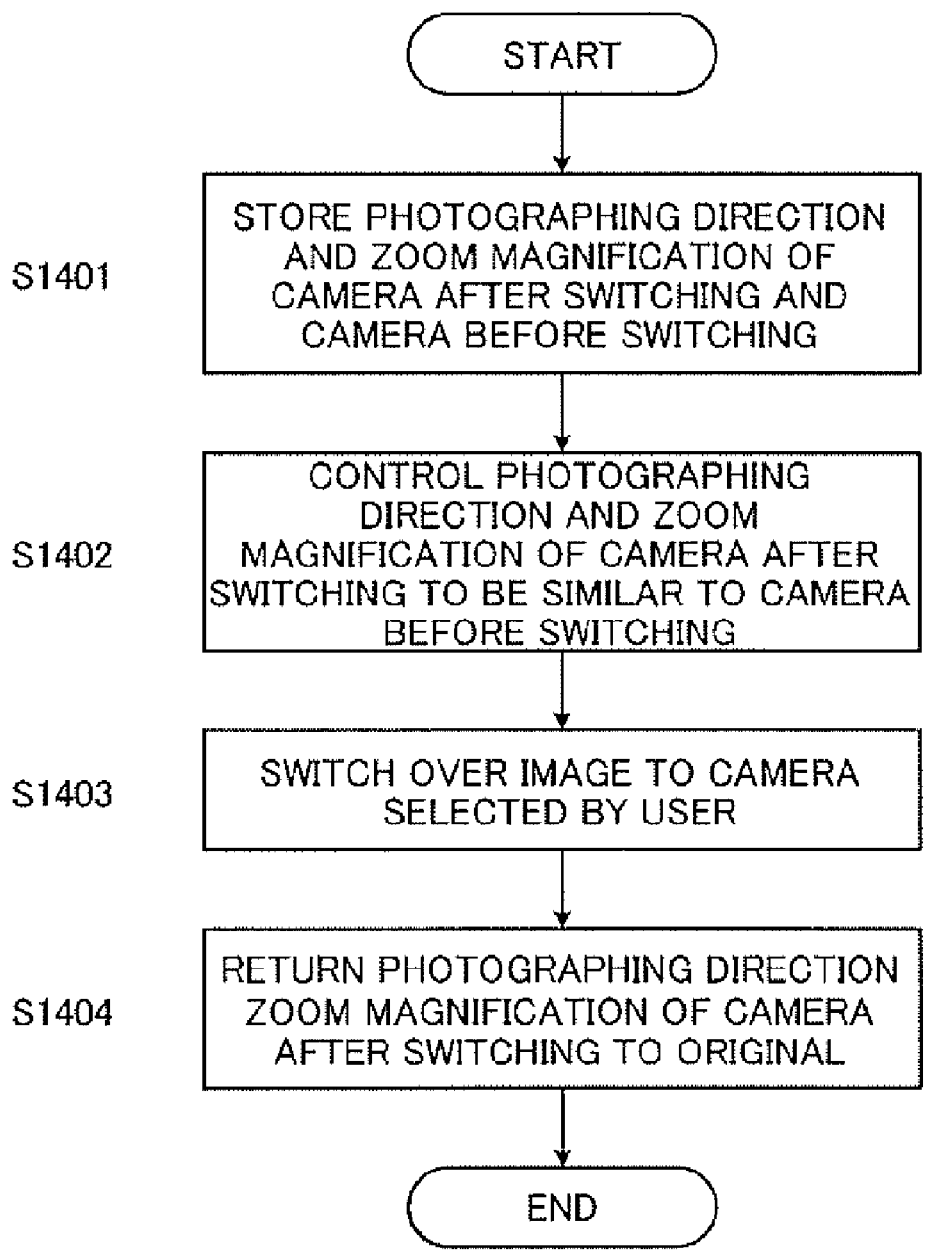
FIG. 19 is a flow chart showing the flow of a camera control operation in the case of the camera control apparatus according to Embodiment 2 of the present invention controlling a camera after to switching.

The flow of the control operation of the camera before switching and the camera after switching in this case is shown in FIG. 19. First, camera image switching instruction is given from a user, camera control information transmitting/receiving section 124 inquires photographing direction zoom magnification control equipment 110 connected to the cameras about the photographing direction and zoom magnification of the camera before switching the camera after switching, i.e. of the camera instructed to be switched over to by the user, and stores the acquired photographing direction and zoom magnification in photographing direction zoom magnification storage section 802 (step S1401). At the same time, photographing direction zoom magnification storage section 802 also stores the focus distance of the camera before switching. Upon completing storage of photographing direction zoom magnification storage section 802, photographing direction adjustment section 801 controls the camera after switching in such a manner that the photographing direction and zoom magnification of the camera after switching is similar to the image of the camera before switching (step S1402). In this event, the method for calculating the photographing direction and zoom magnification of the camera is the same as the method described Embodiment 2. Upon completing control of the photographing direction etc, of the camera after switching, camera control information transmitting/receiving section 124 instructs image switching to camera image switching section 121 and switches over the image (step S1403). Upon completing switching of the image, photographing direction adjustment section 801 receives report that switching of the image is complete from camera image switching section 121 and performs control in such a manner that the photographing direction and zoom magnification of the camera after switching returns to the photographing direction and zoom magnification stored by photographing direction zoom magnification storage section 802 in step S1401 (step S1404).

As a result of this kind of flow, photographing direction adjustment section 801 performs control so that the image of the camera before switching and the image of the camera after switching are made to be close to each other.

In this embodiment, as shown in FIG. 11 and FIG. 12 of this embodiment, camera control apparatus 120 may also display that the camera before switching and the camera after switching are being controlled automatically. The configuration in this case is shown in FIG. 20

Figure 20:
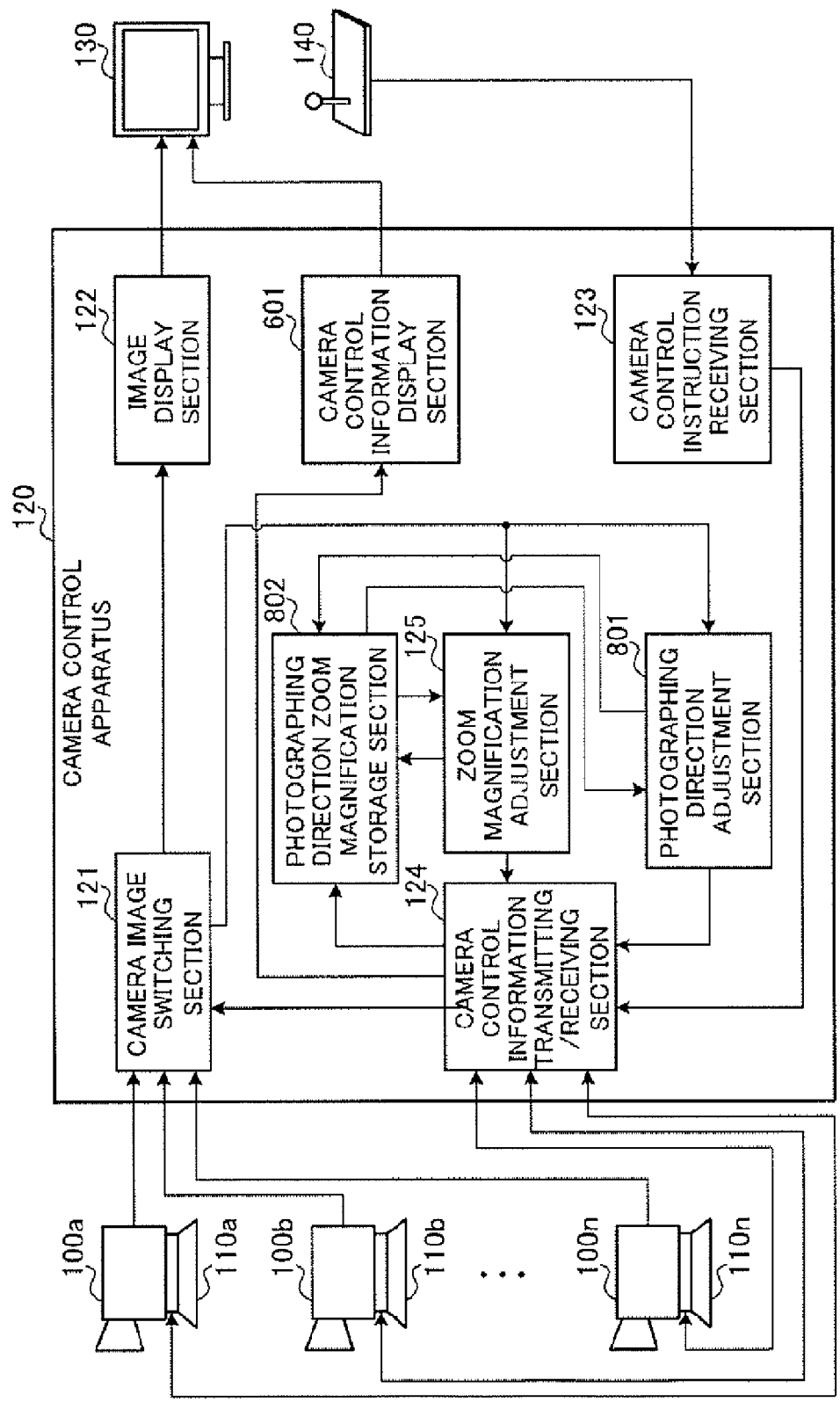
FIG. 20 is a block view showing a configuration of a camera control apparatus displaying a control state of a camera according to Embodiment 2.

The configuration of camera control apparatus 120 shown in FIG. 20 is the configuration of camera control apparatus 120 shown in FIG. 13 with camera control information display section 601 of FIG. 11 added, and other aspects of the configuration are the same as for the configuration of FIG. 13. In FIG. 11, after camera control information transmitting/receiving section 124 instructs switching of the image to camera image switching section 121, camera control information display section 601 displays that the zoom magnification of the camera after switching has been returned to the zoom magnification stored by photographing direction zoom magnification storage section 802 at monitor 130 via camera control information transmitting/receiving section 124. Further, as shown in FIG. 12, automatic control of the zoom magnification of the camera after switching by camera control apparatus 120 of Embodiment 2 may be proposed to the user by a message 701 etc. to the effect of, for example, "zoom magnification is being controlled".

Further, this embodiment may adopt a configuration where the frame rate of an image received by camera image switching section 121 as in Embodiment 1 or the frame rate of the image displayed by image display section 122 is referred to, and the photographing direction adjustment section 801 adjusts the speed for changing the zoom magnification and camera photographing direction of the camera before switching. As a result, as with Embodiment 1, movement of a camera, i.e. of an operation of changing the zoom magnification and photographing direction can be proposed to the user by an image and it is therefore possible for the user to understand the photographing direction of a camera more intuitively.

In the above, according to Embodiment 2, when a user selects a camera image to be displayed, in addition to control being exerted in such a manner that the zoom magnification of the selected camera being put to the widest angle by zoom magnification adjustment section 125 and then being returned to the zoom magnification stored in storage section 126, photographing direction adjustment section 801 exerts control in such a manner that the photographing direction and zoom magnification of the camera that displayed the image before selection by the user are made to be the same as the photographing position and photographing range of the camera after switching to as great an extent as possible. It is therefore possible for the user to understand the installation position, photographing direction and zoom magnification of the selected camera more intuitively by looking at this image directly after the image is switched over. Namely, a sense of discomfort felt by the user at the time of looking at the image of the camera after switching can be reduced by photographing direction adjustment section 801 making the photographing direction and photographing range of the camera before switching close to the photographing direction and photographing range of the camera after switching. It is therefore possible for the user to intuitively and instantly understand the photographing position, photographing direction and photographing range of the camera simply by looking at the image after switching.

In Embodiment 2, a description is given where the zoom magnification adjusted by zoom magnification adjustment section 125 is taken to be at the widest angle but the present invention is not limited to this. Namely, zoom magnification adjustment section 125 only has to change the zoom magnification to a wide angle, i.e. to a low magnification, to the extent that the user intuitively understands the photographing direction and zoom magnification of the camera simply by looking at the image of the camera and where the image for the camera is being photographed after switching.

Namely, according to Embodiment 2, zoom magnification adjustment section 125 changes the zoom magnification of the camera to a zoom magnification of an angle wider than the magnification stored in storage section 126 before switching to the image of the camera instructed to be switched over to by the user by camera image switching section 121, i.e. to a reference magnification lower than the stored zoom magnification. Photographing direction adjustment section 801 acquires photographing direction information specifying the photographing direction of the image of the camera instructed to be switched over to and photographing range information specifying the photographing range. Photographing direction adjustment section 801 then changes the photographing direction and photographing range of the image of the camera currently being displayed at image display section 121 to be as close as possible to being the same as the photographing direction and photographing range of the image of the camera before switching. As a result of zoom magnification adjustment section 125 returning the zoom magnification of the camera from the reference magnification to the zoom magnification stored by zoom magnification storage section 126, it is possible for a user to understand the photographing position, photographing direction and zoom magnification of the camera more intuitively by looking at the image, and also to start control of the camera immediately in the event of changing to a desired photographing direction and zoom magnification.

EMBODIMENT 3

Camera control apparatus 120 of Embodiment 1 is described as making the zoom magnification the widest angle after storing the zoom magnification of the camera instructed to be switched over to in the event that camera image switching instruction is given from a user. Camera control apparatus 120 of Embodiment 3 of the present invention performs optimization processing for changing magnification making the zoom magnification the widest angle using landmark image information which specifies the photographing position and the photographing direction of the camera after switching.

Figure 21:
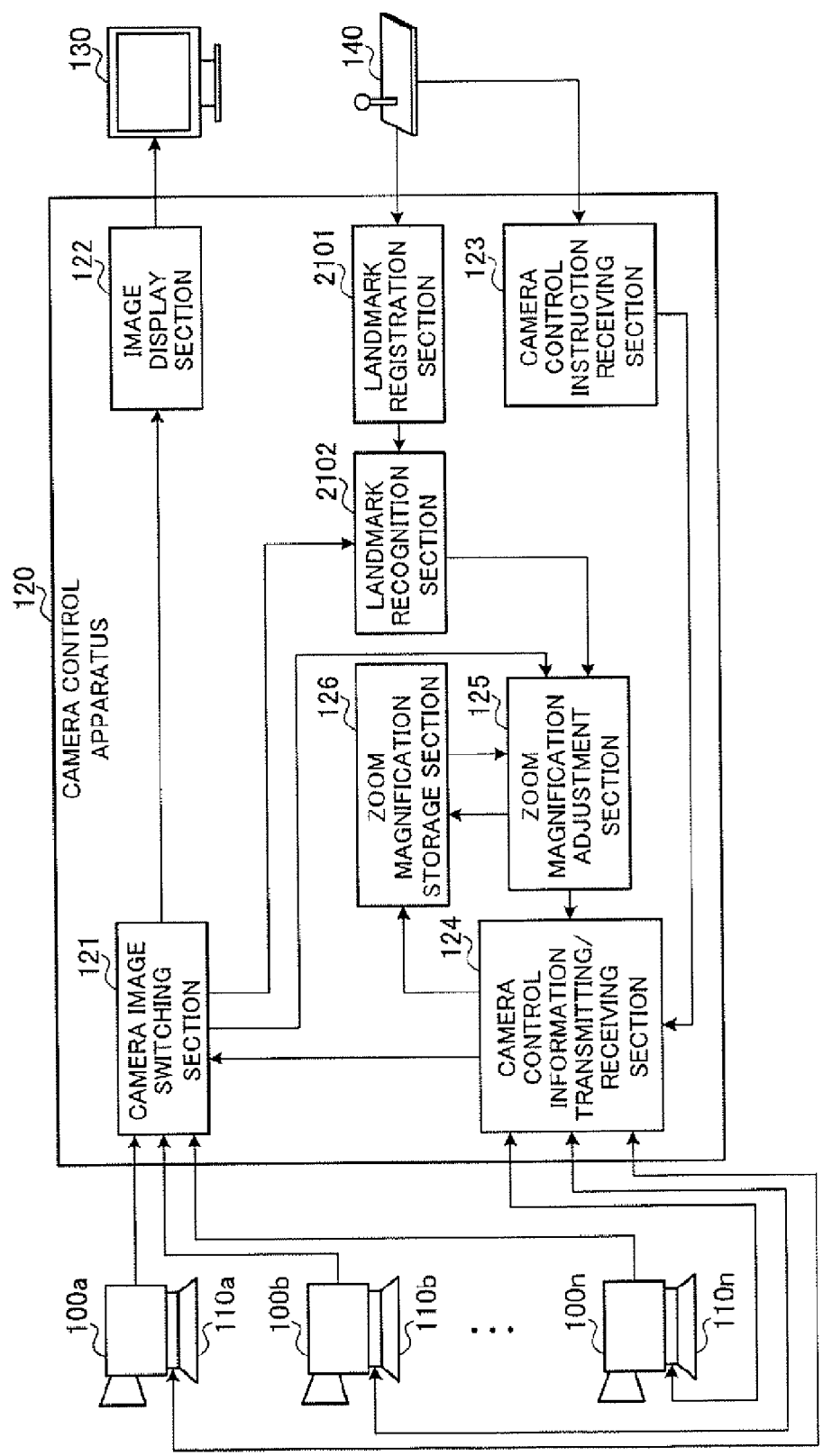
FIG. 21 is a block view showing an example of a configuration of a camera control apparatus according to Embodiment 3 of the present invention.

A configuration view of camera control apparatus 120 of Embodiment 3 of the present invention is shown in FIG. 21. In addition to the configuration of camera control apparatus 120 of FIG. 6, camera control apparatus 120 of FIG. 21 has landmark registration section 2101 that registers image information for a landmark existing within the photographing range of each camera and specifying the photographing position and photographing direction of cameras, and landmark recognition section 2102 that determines whether or not image information for a landmark exists within an image of a camera after switching. Other aspects of the configuration are the same as for camera control apparatus 120 of Embodiment 1 shown in FIG. 6 so that the same aspects of the configuration are assigned the same reference numerals, and detailed descriptions thereof will be omitted.

Figure 22:
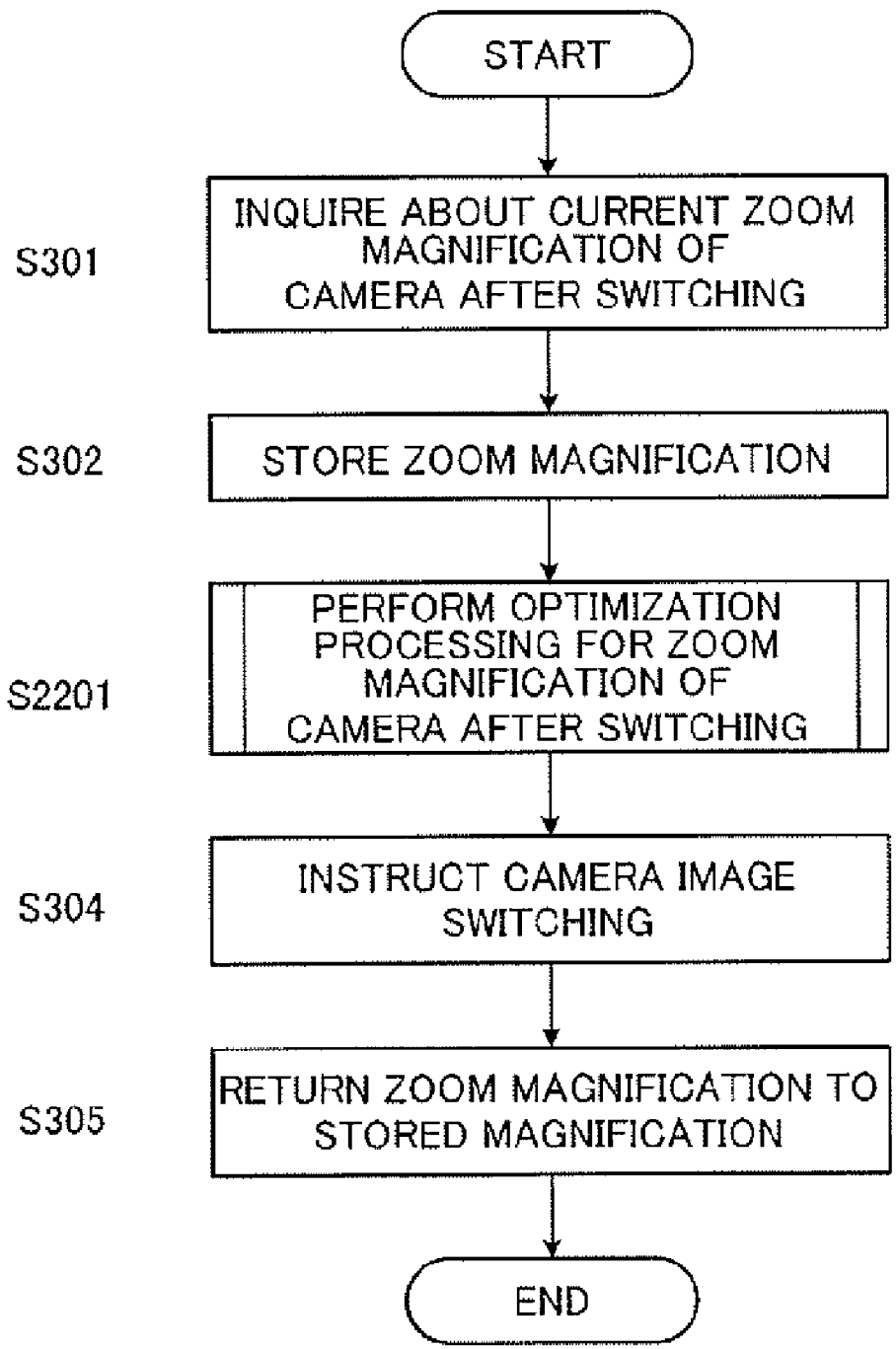
FIG. 22 is a flow chart showing the flow of a camera control operation of a camera control apparatus according to Embodiment 3 of the present invention.

Next, a description is given of the operation of camera control apparatus 120 of this embodiment using FIG. 22. FIG. 22 is a flow chart illustrating the camera control operation of camera control apparatus 120 of this embodiment. FIG. 22 differs only in that step S2201 is different to step S303 of FIG. 8 with other aspects of the operation being the same as for FIG. 8 so that the same components are assigned the same reference numerals, and detailed descriptions thereof will be omitted. In Embodiment 3, after zoom magnification storage section 126 stores the zoom magnification of the camera instructed to be switched over to by the user in step S302, zoom magnification adjustment section 125 performs optimization processing for the zoom magnification of the camera after switching based on the determination results of landmark recognition section 2102 in step S2201, instead of making the zoom magnification of the camera after switching the widest angle. Camera control apparatus 120 then moves to the operation of step S304 onwards.

Figure 23:
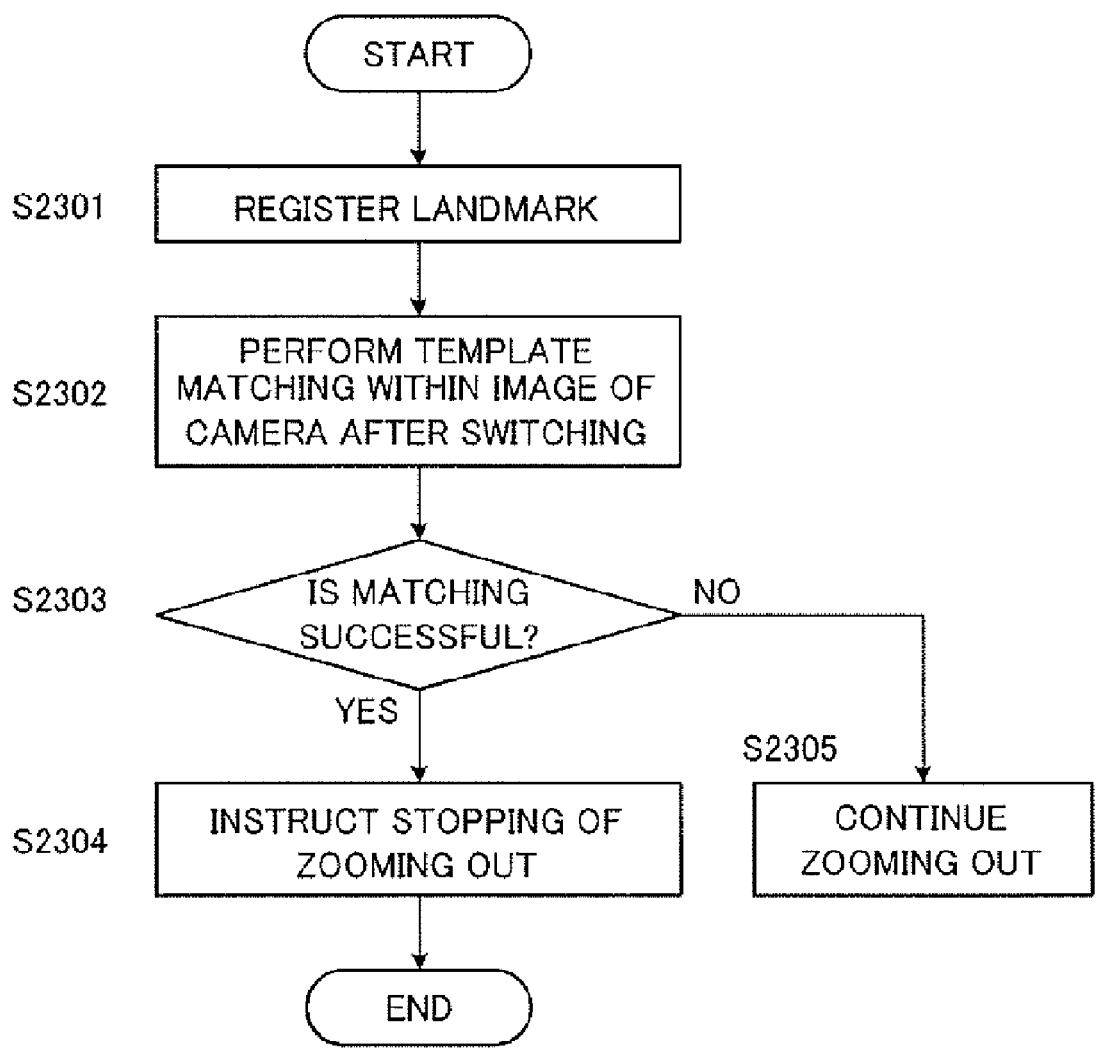
FIG. 23 is a flow chart illustrating the flow of zoom magnification optimization processing according to Embodiment 3 of the present invention.

Next, an example of optimization processing for the zoom magnification of a camera after switching is described in detail using FIG. 23. FIG. 23 is a flow chart illustrating an example of optimization processing for zoom magnification of the camera after switching.

First, a user or system administrator designates a landmark of an object etc. by pointing device 140 and extracts a template for image information for the landmark. Here, landmarks are items existing within the photographing range of each of the cameras 100a to 100n that specify the photographing position or photographing direction of a camera and may be, for example, a construction such as a building etc. having a characteristic height, shape, and color, etc. Landmark registration section 2101 then registers a template of image information for the template to landmark as landmark image information and provides this to landmark recognition section 2102 (step S2301). This landmark image information is information for determining whether or not the landmark is in an image of a camera instructed to be switched over to, and specifically refers to the landmark image itself, color, brightness, shape, and edge information etc.

Landmark recognition section 2102 receives an image of a camera instructed to be switched over to constituting a target for detection of the presence or absence of a landmark from camera image switching section 121 when camera switching instruction is given from a user. Landmark recognition section 2102 performs template matching to determine whether or not landmark image information received from landmark registration section 2101 exists within an image of a camera instructed to be switched over to zoomed out by zoom magnification adjustment section 125, i.e. changed to a reference magnification lower than the zoom magnification stored in zoom magnification storage section 126 (step S2302). This template matching saves templates such as image information in a database in advance, numerically calculates overlapping of profiles with these templates and high or low degree of similarity, and extracts and recognizes characteristic components such as contour and shape etc. This template matching is, for example, described in detail in the "Image recognition handbook," by Takagi and Shimoda, (University of Tokyo Press, p 707). Here, template matching that is an example of the most fundamental recognition method is carried out but this recognition method is not limited to and various recognition methods exist. Further, in Embodiment 3, although not mentioned with regards to the size of the template, matching methods corresponding to variations in size, i.e. corresponding to cases where the sizes of the templates and the images being matched are different also exist.

In the event that matching is successful in step S2302 (step S2303), i.e. in the event that landmark image information is detected from within images for a camera instructed to be switched over to, landmark recognition section 2102 determines that the zoom magnification has been widened to an extent where it is possible to intuitively understand the photographing direction and zoom magnification of the camera simply by the user looking at the camera image. Landmark recognition section 2102 then instructs zoom magnification adjustment section 125 to stop zooming out, and zoom magnification adjustment section 125 stops changing the zoom magnification (step S2304). Then, optimization processing for the zoom magnification is complete, and when camera image switching section 121 switches the camera image (step S304), zoom magnification adjustment section 125 returns the zoom magnification at the time of stopping the zoom magnification adjustment operation to the zoom magnification stored in zoom magnification storage section 126 based on instructions of landmark recognition section 2102 (step S305).

On the other hand, in the event that matching is not successful in step S2303, landmark recognition section 2102 does not instructs stopping of zooming out. Zoom magnification adjustment section 125 therefore continues to zoom out (step S2305).

According to Embodiment 3, landmark recognition section 2102 determines whether or not landmark image information registered at landmark registration section 2101 exists within an image of the camera instructed to be switched over to. When a landmark exists, landmark recognition section 2102 determines that zoom magnification has been widened to an angle to an extent that the user can intuitively understand the photographing direction and zoom magnification of the camera simply by looking at the camera images and instructs zoom magnification adjustment section 125 to stop the operation of changing zoom magnification. As a result, zoom magnification adjustment section 125 can make the zoom magnification adjustment time for changing to a reference magnification lower than the zoom magnification stored in zoom magnification storage section 126 shorter without zooming out more than necessary. According to Embodiment 3, in addition to the results of Embodiments 1 and 2, as a landmark specifying the photographing position and photographing direction of the camera is also taken in the image of the camera after switching where the zoom magnification has been changed to a wide state, it is possible for the user to intuitively understand the photographing position, photographing direction and zoom magnification of the camera.

The configuration of camera control apparatus 120 of Embodiment 3 is not limited to this configuration, and application of camera control apparatus 120 of Embodiments 1 and 2 is also possible.

EMBODIMENT 4

In Embodiment 3, landmark image information is used to perform optimization processing for changing zoom magnification. In Embodiment 4 of the present invention, landmark position information is used to perform optimization processing for changing zoom magnification.

Figure 24:
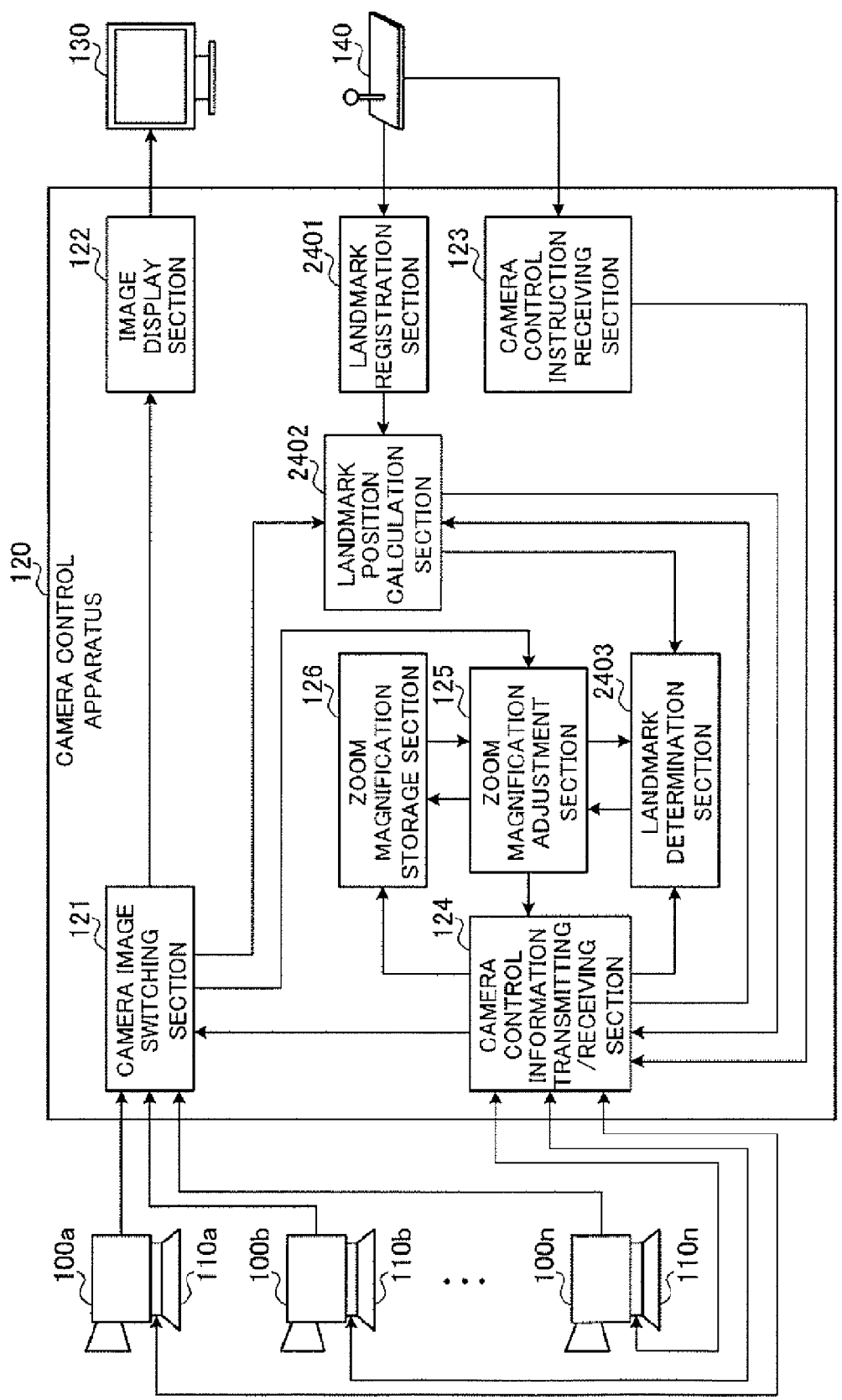
FIG. 24 is a block view showing an example of a configuration of a camera control apparatus according to Embodiment 4 of the present invention.

A configuration view of camera control apparatus 120 of Embodiment 4 of the present invention is shown in FIG. 24. In camera control apparatus 120 of FIG. 24, landmark registration section 2401, landmark position calculation section 2402 and landmark determination section 2403 are added to camera control apparatus 120 of FIG. 6. Other aspects of the configuration are the same as for camera control apparatus 120 of Embodiment 1 shown in FIG. 6 so that the same components are assigned the same reference numerals, and detailed descriptions thereof will be omitted.

Figure 25:
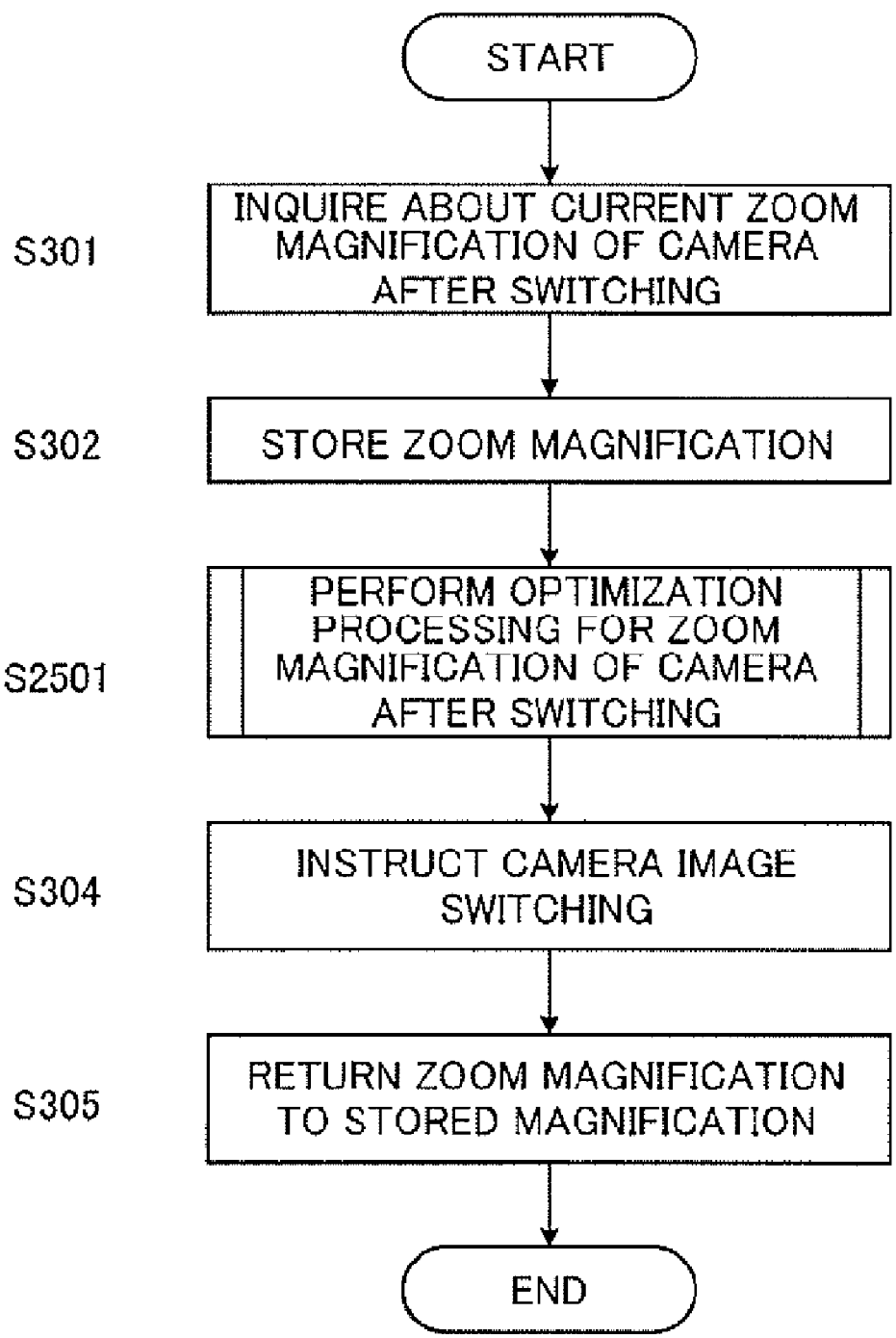
FIG. 25 is a flow chart showing the flow of a camera control operation of a camera control apparatus according to Embodiment 4 of the present invention.

Next, a description is given of the operation of camera control apparatus 120 of this embodiment. FIG. 25 is a flowchart illustrating the camera control operation of camera control apparatus 120 of this embodiment. FIG. 25 differs only in that step S2501 is different to step S303 of FIG. 8 with other aspects of the operation being the same as for FIG. 8 so that the same components are assigned the same reference numerals, and detailed descriptions thereof well be omitted. In Embodiment 3, after zoom magnification storage section 126 stores the zoom magnification of the camera instructed to be switched over to by the user in step S302, zoom magnification adjustment section 125 performs optimization processing of the zoom magnification of the camera after switching based on the determination results of landmark determination section 2403 in step S2501, instead of making the zoom magnification of the camera after switching the widest angle. Camera control apparatus 120 then moves to the operation of step S304 onwards.

Figure 26:
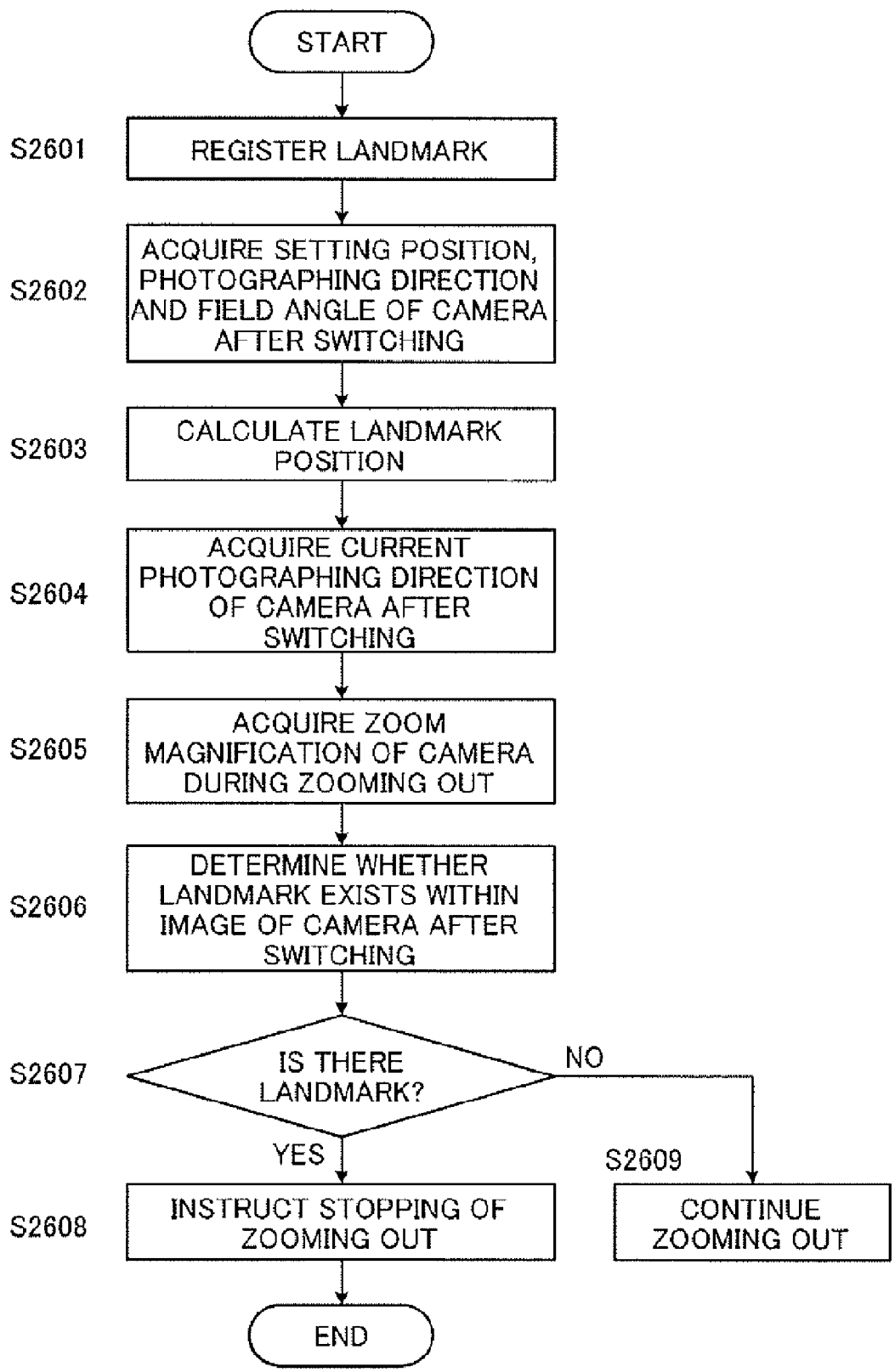
FIG. 26 is a flow chart illustrating the flow of zoom magnification optimization processing according to Embodiment 4 of the present invention.

Next, an example of optimization processing for zoom magnification of a camera after switching is described in detail using FIG. 26. FIG. 26 is a flowchart illustrating an example of optimization processing for zoom magnification of the camera after switching.

First, a user or system administrator designates a landmark of an object etc. by pointing device 140. Here, landmarks are items existing within the photographing range of each of the cameras 100a to 100n that specify the photographing position or photographing direction of a camera and may be, for example, a construction such as a building etc. having a characteristic height, shape, and color, etc. Landmark registration section 2401 registers position coordinates of the landmark on the images of the camera and provides the position coordinates to landmark position calculation section 2402 (step S2601).

Next, landmark position calculation section 2402 inquires about and acquires the installation position, photographing direction and field angle of the camera before switching i.e. the camera currently displayed at monitor 130 from photographing direction zoom magnification control equipment 110 via camera control information transmitting/receiving section 124 (step S2602). Landmark position calculation section 2402 calculates the position of a landmark from position coordinates of the landmark received from landmark registration section 2401 and the installation position, photographing direction and field angle of the camera received from camera control information transmitting/receiving section 124 and provides the position to landmark determination section 2403 (step S2603).

Here, a detailed description is given of a landmark position calculating method of landmark position calculation section 2402 using FIG. 27.

Figure 27A:
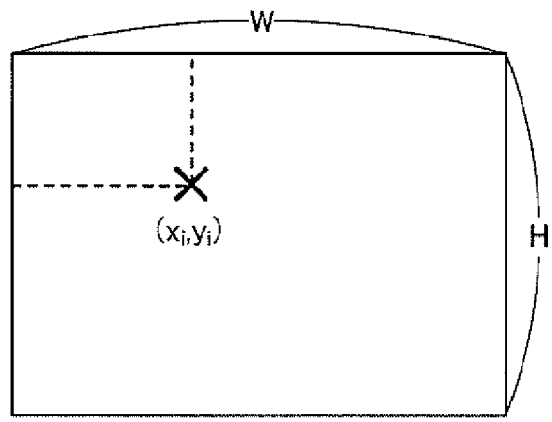
FIG. 27 illustrates a landmark position calculating method according to Embodiment 4 of the present invention.

FIG. 27A shows landmark position coordinates on an image of a camera before switching, i.e. a camera image currently displayed at monitor 130. Here, w indicates camera image width, H indicates camera image height, and $(x_i, y_i)$ indicates the coordinates of the position of a landmark on the camera image. The position coordinates $(x_i, y_i)$ is position information registered by landmark registration section 2401.

Figure 27B:
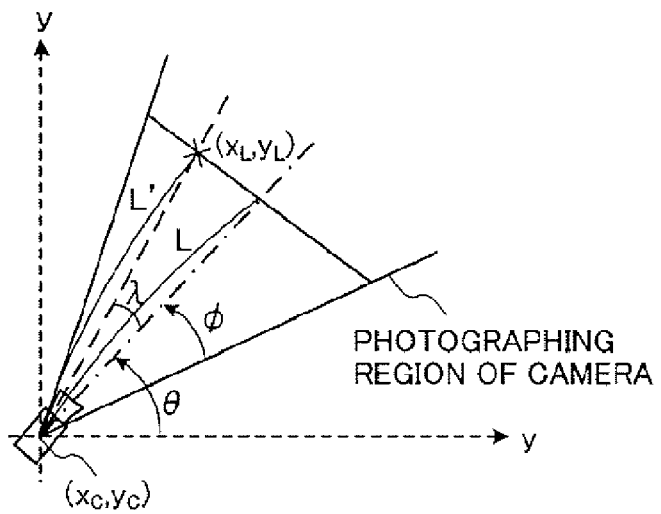

FIG. 27B shows the coordinates of the photographing region of the camera as viewed from above. Here, $(x_c, y_c)$ are camera installation position coordinates, and $(x_L, y_L)$ are landmark position coordinates obtained by landmark position calculation section 2402. Further, φ is the zoom magnification (field angle) of the camera, and L is the focus distance of the camera.

The landmark position coordinate $x_L$ is expressed in the following equation (7) formed by distance L' from the camera to the landmark, camera photographing angle θ, and angle λ formed by the center of the camera photographing region and the camera and landmark.

[Equation 7]

$$x_L = \frac{L'}{\cos(\theta + \lambda)} + x_C \qquad (7)$$

Here, the angle λ formed by the camera and the landmark and the distance L' from the camera to the landmark can be expressed by the following equations (8) and (9).

[Equation 8]

$$\lambda = \tan^{-1}\left(\frac{(|w - 2xi|)}{w}\tan\phi\right) \qquad (8)$$

$$L' = \frac{L}{\cos\lambda} = \frac{L}{\cos\left(\tan^{-1}\left(\frac{(|w - 2xi|)}{w}\tan\phi\right)\right)} \qquad (9)$$

$x_L$ can then be obtained from the following equation (10) by substituting equation (8) and equation (9) in equation (7).

[Equation 9]

$$x_L = \frac{\frac{L}{\cos\left(\tan^{-1}\left(\frac{(|w - 2xi|)}{w}\tan\phi\right)\right)}}{\cos\left(\theta + \tan^{-1}\left(\frac{(|w - 2xi|)}{w}\tan\phi\right)\right)} + x_C \qquad (10)$$

Similarly, landmark position coordinate $y_L$ can be expressed by the following equation (11).

[Equation 10]

$$y_L = \frac{L'}{\sin(\theta + \lambda)} + y_C \qquad (11)$$

When the results obtained in equation (8) and (9) for the angle λ and the distance L' from the camera to the landmark are substituted, $y_L$ can be obtained from the following equation (12).

[Equation 11]

$$y_L = \frac{\frac{L}{\cos\left(\tan^{-1}\left(\frac{(|w - 2xi|)}{w}\tan\phi\right)\right)}}{\sin\left(\theta + \tan^{-1}\left(\frac{(|w - 2xi|)}{w}\tan\phi\right)\right)} + y_C \qquad (12)$$

Figure 27C:
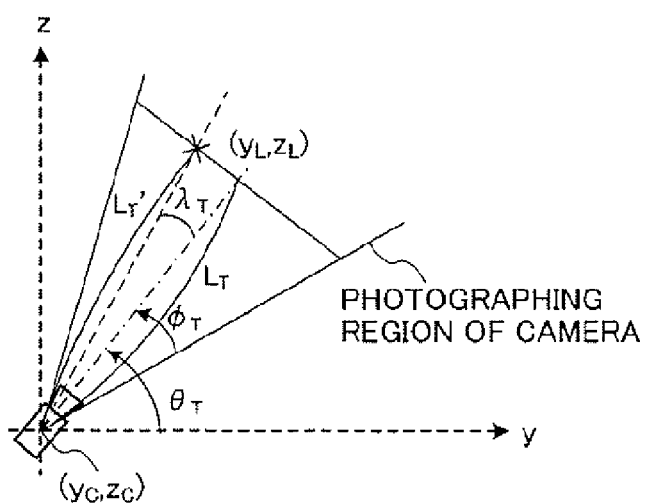

Further, in the event that the height of the landmark is obtained, the drawing of FIG. 27B is changed to being a view from right beside, and a similar trigonometric function operation is carried out. FIG. 27C shows the coordinates of the photographing region of the camera shown in FIG. 27B as viewed from right beside. Here, $(y_C, z_C)$ are camera installation position coordinates, and $(y_L, z_L)$ are landmark position coordinates obtained by landmark position calculation section 2402. Further, φ is the zoom magnification (field angle) of the camera, and $L_T$ is the focus distance of the camera.

The landmark position coordinate $z_L$ is expressed in the following equation (13) from distance $L_T'$ from the camera to the landmark, camera photographing angle $\theta_T$, and angle $\lambda_T$ formed by the center of the camera photographing region and the camera and landmark.

[Equation 12]

$$z_L = \frac{L_T'}{\sin(\theta_T + \lambda_T)} + z_C \qquad (13)$$

Here, the angle $\lambda_T$ formed by the camera and the landmark and the distance $L_T'$ from the camera to the landmark can be expressed by the following equations (14) and (15).

[Equation 13]

$$\lambda_T = \tan^{-1}\left(\frac{|H - 2yi|}{H}\tan\phi_T\right) \qquad (14)$$

$$L_T' = \frac{L}{\cos\lambda_T} = \frac{L}{\cos\left(\tan^{-1}\left(\frac{|H - 2yi|}{H}\tan\phi_T\right)\right)} \qquad (15)$$

When the results obtained in equation (14) and (15) for the angle $\lambda_T$ formed by the camera and the landmark and the distance $L_T'$ from the camera to the landmark are substituted, $z_L$ can be obtained from the following equation (16).

[Equation 14]

$$z_L = \frac{\frac{L}{\cos\left(\tan^{-1}\left(\frac{(|H - 2yi|)}{H}\tan\phi_T\right)\right)}}{\sin\left(\theta_T + \tan^{-1}\left(\frac{(|H - 2yi|)}{H}\tan\phi_T\right)\right)} \qquad (16)$$

Landmark position calculation section 2402 calculates the position coordinates constituting the position information for the landmark from the position coordinates of the landmark on the camera image received from landmark registration section 2401, the installation position coordinates, photographing direction and field angle of the camera before switching received from camera control information transmitting and receiving section 124.

When camera switching instruction is given from the user, camera control information transmitting and receiving section 124 acquires the current photographing position and photographing direction of the camera instructed to be switched over to acquired from photographing direction zoom magnification control equipment 110 connected to the camera, and landmark determination section 2403 acquires the current photographing direction of the camera received from camera control information transmitting/receiving section 124 (step S2604). Next, landmark determination section 2403 acquires the current zoom magnification of the camera zooming out from zoom magnification adjustment section 125 (step S2605).

Landmark determination section 2403 then geometrically determines whether or not the landmark can be within the image of the camera after switching that is zooming out from landmark position information calculated by landmark position calculation section 2402 in step S2603, and the photographing position, photographing direction and zoom magnification of the camera instructed to be switched over to acquired in steps S2604 and S2605 Namely, it is determined whether or not the position coordinates of the landmark calculated by position calculation section 2402 as described in FIG. 27 is within the image changed to a reference magnification lower than the magnification stored in zoom magnification storage section 126 (step S2606).

Figure 28:
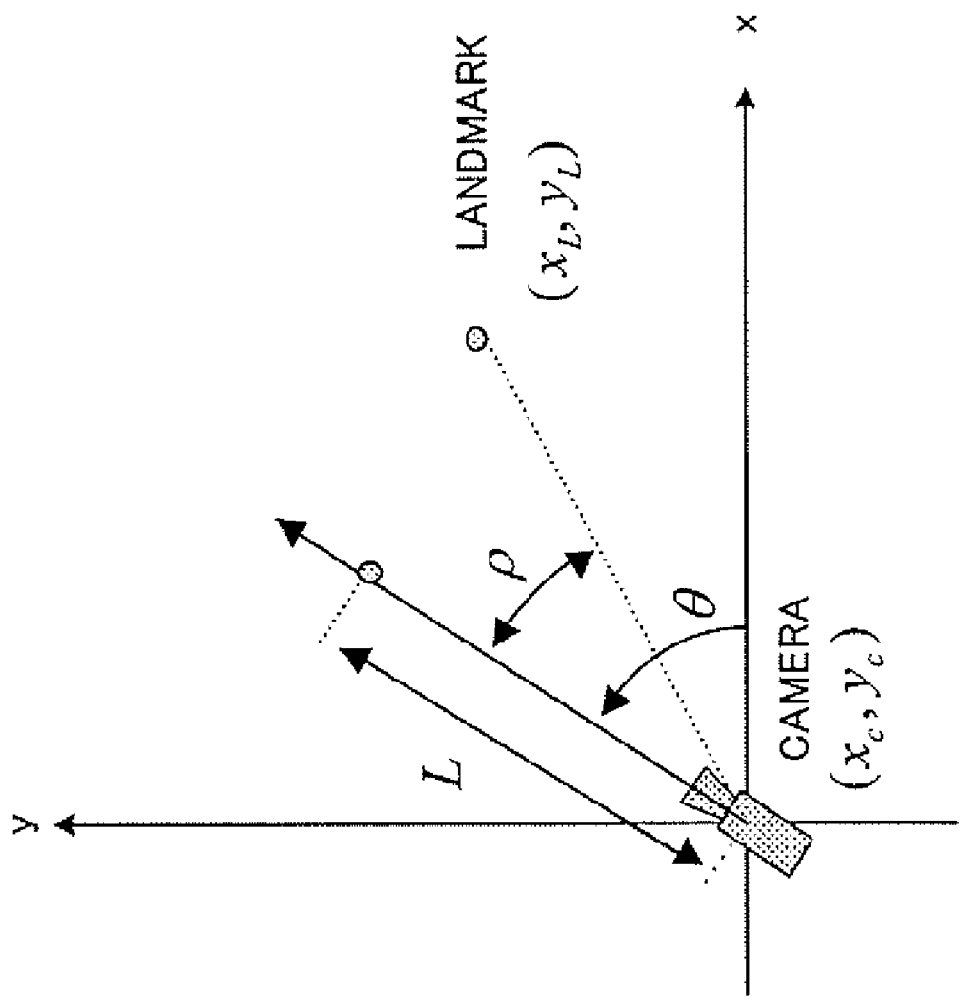
FIG. 28 illustrates a landmark determination method according to Embodiment 4 of the present invention.

Specifically, as shown in FIG. 28, the distance from camera $(x_c, y_c)$ after switching to landmark $(x_L, y_L)$ can be obtained from the following equation (17). The obtained field angle $\rho$, i.e. the magnification the landmark enters at the camera after switching can be obtained from the following equation (18). Here, L is the distance of the focal point (focus) of the camera, and $\theta$ is the photographing angle of the camera.

[Equation 15]

$$\sqrt{(x_L - x_c)^2 + (y_L - y_c)^2} \qquad (17)$$

$$\rho = \cos^{-1} \frac{L}{\sqrt{(x_L - x_c)^2 + (y_L - y_c)^2}} \qquad (18)$$

As the current field angle of the camera after switching is known by the camera itself, at the time the field angle of the camera being zoomed out becomes the field angle $\rho$ obtained in the equation (18), landmark determination section 2403 stops the zoom-out operation of zoom magnification adjustment section 125. In this way, landmark determination section 2403 calculates the field angle with which the landmark enters to the photographing range of the camera after switching from the landmark position coordinates determines that a landmark has entered the image in the event that the field angle of the camera zooming out has become the aforementioned field angle, and stops zooming out. In the case of obtaining an field angle in the height direction, $(x_c, y_c)$ of equation (18) may be made $(y_c, z_c)$, and $(x_L, y_L)$ may be made $(y_L, z_L)$.

In the event that it is determined that the landmark is within the image of the camera instructed to be switched over to (step S2607), landmark determination section 2403 instructs stopping of the operation of zooming out of the camera instructed to be switched over to by zoom magnification adjustment section 125, and zoom magnification adjustment section 125 stops changing the zoom magnification (step S2608). When optimization processing for the zoom magnification is complete, and camera image switching section 121 switches the camera image (step S304), zoom magnification adjustment section 125 returns the zoom magnification at the time of stopping the zoom magnification adjustment operation to the zoom magnification stored in zoom magnification storage section 126 based on instructions of landmark determination section 2403 (step S305).

On the other hand, in the event that it is determined in step S2607 that the landmark is not within the image of the camera instructed to be switched over to, landmark determination section 2403 does not instruct stopping of zooming out. Zoom magnification adjustment section 125 therefore continues to zoom out (step S2609).

According to Embodiment 4, in addition to the results of Embodiments 1 and 2, whether or not a landmark is within an image of a camera that is zooming out is determined geometrically from position information of the landmark calculated by landmark position calculation section 2402 from within the image of the camera instructed to be switched over to by landmark determination section 2403 and from the photographing position, photographing direction and zoom magnification of the camera instructed to be switched over to. When a landmark exists, landmark determination section 2403 determines that zoom magnification has been widened to an angle to an extent that the user can intuitively understand the photographing direction and zoom magnification of the camera simply by looking at the camera images and instructs for the operation of changing zoom magnification to be stopped at zoom magnification adjustment section 125. As a result, zoom magnification adjustment section 125 can make the zoom magnification adjustment time for changing to a reference magnification lower than the magnification stored in zoom magnification storage section 126 shorter without it being necessary to zoom out more than necessary. Further, as there is a landmark specifying photographing position and photographing direction of the camera taken in the image of the camera after switching with the zoom magnification changed to a wide-angle state, it is possible for the user to understand the photographing position, photographing direction and zoom magnification of the camera more intuitively.

The configuration of camera control apparatus 120 of Embodiment 4 is not limited to this configuration, and application of camera control apparatus 120 of Embodiments 1 and 2 is also possible.

EMBODIMENT 5

A description is given where, in the event camera images switching instruction is given by a user, camera control apparatus 120 of Embodiments 1 to 4 displays the zoom magnification of the camera after switching from a predetermined magnification to a wide-angle, and returns the zoom magnification of the camera to a predetermined magnification after the image is switched over. Camera control apparatus 120 of Embodiment 5 of the present invention determines whether or not a switching image for interpolating an image of a camera before switching and after switching is generated based on relative position of the cameras before switching and after switching. For example, in the event of a positional relationship where a camera for which an image is currently displayed at a monitor and a camera instructed to be switched over to by the user are photographing the same object or same location, it is possible for the user to understand the photographing position and photographing direction more intuitively from the image of the camera after switching by providing the user with a switching image for interpolating the camera images before switching and after switching.

During switching of the camera images, in order to make the relative relationship of the installation positions and photographing directions of the cameras before switching and after switching easier to understand, camera control apparatus 120 sets the photographing directions in such a manner that the cameras photograph the same object before switching and after switching. A center image interpolating the photographing directions of the two cameras is then generated as a switching image using computer graphics (CG) and is visually imaged. The following is a detailed description of camera control apparatus 120 of this embodiment with the accompanying figures.

Figure 29:
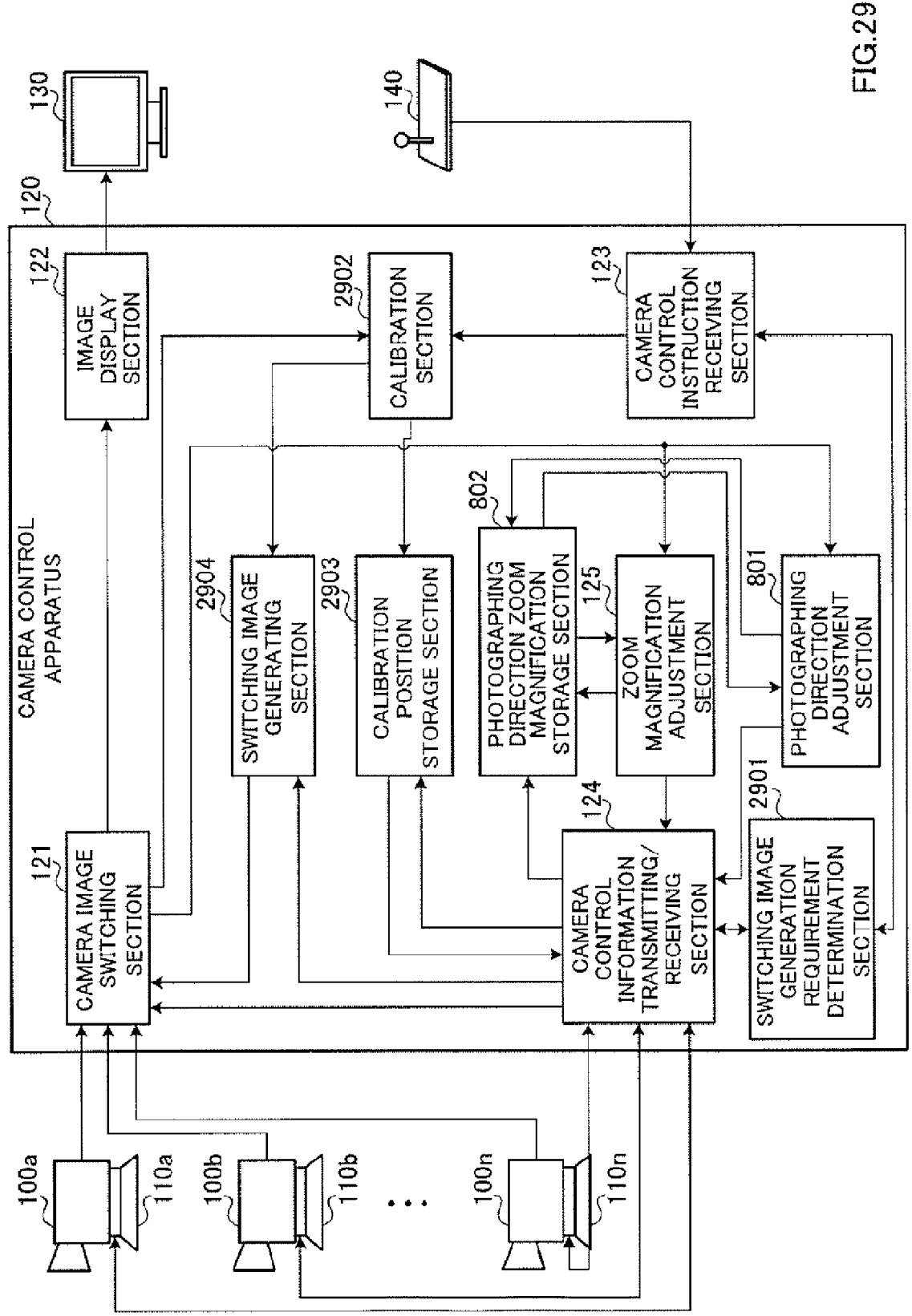
FIG. 29 is a block view showing an example of a configuration of a camera control apparatus according to Embodiment 5 of the present invention.

An example of a configuration of camera control apparatus 120 of this embodiment is shown in FIG. 29. In addition to the configuration of camera control apparatus 120 of Embodiment 2, camera control apparatus 120 is provided with switching image generation requirement determination section 2901 that determines whether or not to generate a switching image for interpolating a camera image after switching from camera images before switching and after switching based on the relative relationship of the camera after switching and the camera before switching, calibration section 2902 that performs calibration based on determination results of switching image generation requirement determination section 2901, calibration position storage section 2903 that stores the photographing direction of the camera before switching and after switching from the calibration results of calibration section 2902, and switching image generating section 2904 that generates a switching image from the images of the camera before switching and after switching based on calibration results. Other aspects of the configuration are the same as for camera control apparatus 120 of the Embodiment 2 shown in FIG. 13 so that the same components are assigned the same reference numerals, and detailed descriptions thereof will be omitted.

Figure 30:
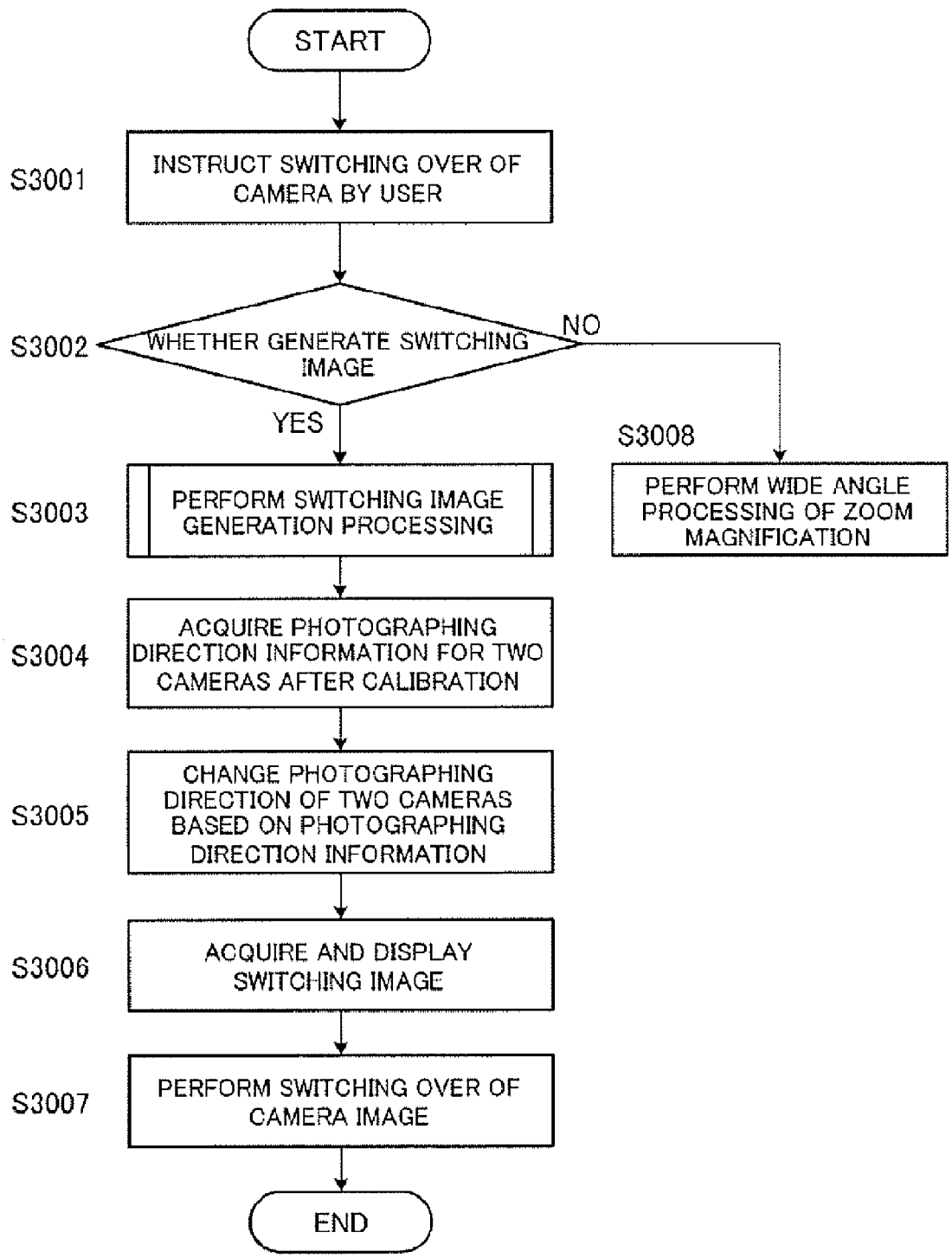
FIG. 30 is a flow chart showing the flow of a camera control operation of a camera control apparatus according to Embodiment 5 of the present invention.

Next, a description is given of the operation of camera control apparatus 120 using FIG. 30. FIG. 30 is a flow chart illustrating the camera control operation of camera control apparatus 120 of this embodiment.

First, when camera control instruction receiving section 123 receives an instruction to switch cameras from the user (step S3001), switching image generation requirement determination section 2901 determines whether or not to generate a switching image (step S3002). Here, in the event that, for example, the positional relationship of the camera before switching and the camera after switching are positioned facing in such a manner as to take in the same object, switching image generation requirement determination section 2901 determines whether generation of a switching image constituting a center image for the camera images before switching and after switching will give the user a more intuitive understanding of the photographing direction etc. of the camera image after switching. Further, for example, in the event that the positional relationship is such that the camera before switching and the camera after switching photograph individual buildings and locations, as described for Embodiments 1 to 4, switching image generation requirement determination section 2901 determines whether displaying with the zoom magnification of the camera instructed to be switched over to at a wide angle is beneficial in giving the user more intuitive understanding of the photographing direction etc. of the image of the camera after switching. In the event that it is determined to generate a switching mage, the switching image generation processing of step S3003 is proceeded to, and in the event that it is determined not to generate a switching image, the processing of step S3008 is proceeded to.

Figure 31:
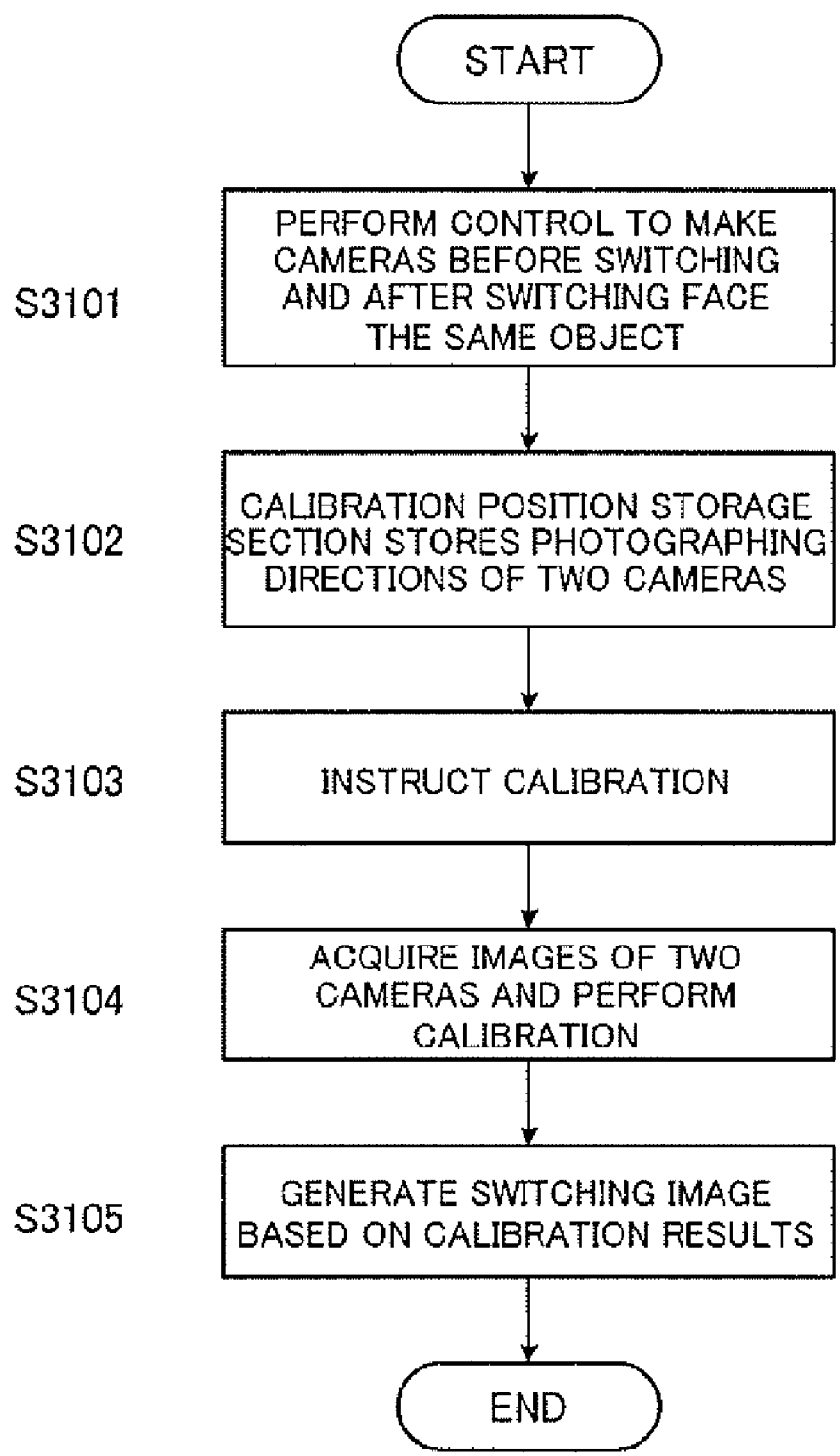
FIG. 31 is a flowchart illustrating switching image generation processing of a camera control apparatus according to Embodiment 5 of the present invention.

A description is now given of switching image generation processing of step S3003 using FIG. 31. FIG. 31 is a flow chart illustrating switching image generation processing.

Figure 32A:
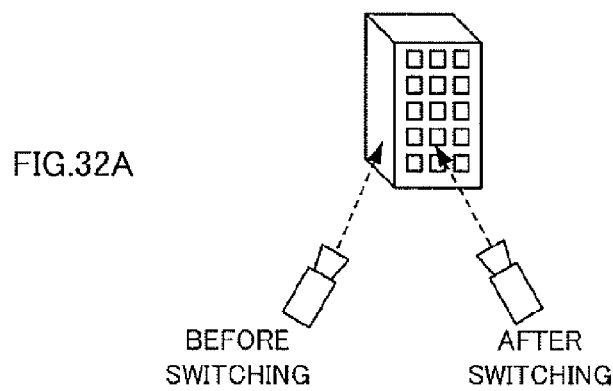
FIG. 32 illustrates switched images generated by the camera control apparatus according to Embodiment 5 of the present invention.
Figure 32B:
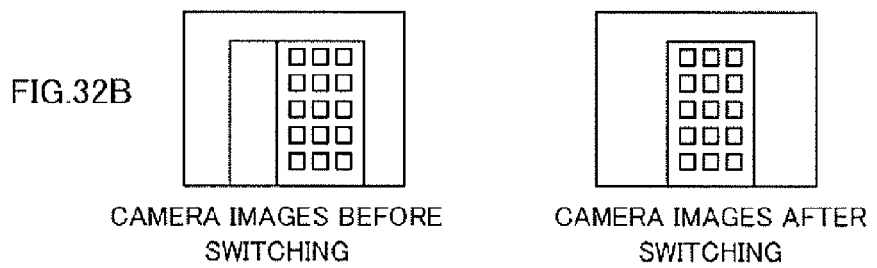

First, in the event that it is determined that a switching image is to be generated at switching image generation requirement determination section 2901, camera control information transmitting/receiving section 124 exerts control in such a manner that the photographing direction of the camera before switching and after switching faces towards the same object, as shown in FIG. 32A (step S3101). Camera control information transmitting/receiving section 124 obtains the photographing direction of the camera before controlling to change the photographing direction. Next, calibration position storage section 2903 stores the photographing directions for the two cameras (step S3102). Further, camera control instruction receiving section 123 provides a calibration instruction to calibration section 2902 (step S3102), and calibration section 2902 receives camera images before switching and after switching as shown, for example, in FIG. 32B from camera image switching section 121, carries out calibration, and generates calibration results (step S3104). The calibration results are necessary for generating the switching image at switching image generating section 2904.

A description is now given of the calibration. Calibration is technology for measuring the position of items for which a picture has been taken from images photographed by a camera etc. By using this technology, it is possible to calculate values such as camera position and focal length etc. at the time of photographing necessary for restoring information relating to depth such as arrangement of an object within the space in which it exists lost at the time of putting the three-dimensional object into the form of an image from the image. Image synthesis etc. virtually depicting computer graphics in a photograph is then possible by using this technology. Calibration for two cameras is described in detail, for example, Sugimoto, Kuno and Inomiya (eds), "Computer Vision: Technical Critique and Future Perspectives," New Technology Communications Co. Ltd., p. 131.

Figure 32C:
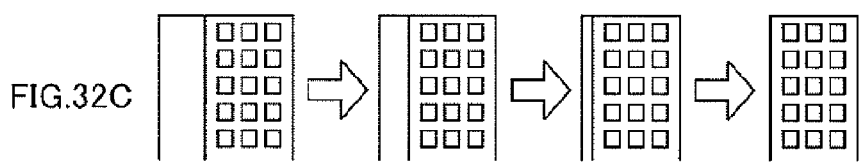

Switching image generating section 2904 then generates a switching image from the calibration results of calibration section 2902 displaying an intermediate state where the object photographed by the camera before switching as shown in FIG. 32C is gradually changed to an object photographed by the camera after switching (step S3105). There are various ways of generating specific intermediate images but as an example, there is View Morphing. View Morphing makes an image interpolating a midpoint in order to represent a situation of gradually changing from a certain shape to another shape by a dynamic image. View morphing techniques are described in detail in Seiz et. al, "View Morphing" (Proc. SIGGRAPH 96, 1996, 21-30).

Here, a description is given where switching image generation processing of step S3101 to step S3105 is carried out from receiving camera switching instructions from a user but the timing of the above processing is not limited to this. Namely, it is also possible for a system administrator to generate a switching image for an arbitrary two cameras of certain cameras that are installed in advance. In this event, the aforementioned switching image generation processing is carried out in groups for all of the cameras and switching image generating section 2904 stores a plurality of switching images generated. The switching image generation processing is then complete.

Camera control information transmitting/receiving section 124 acquires camera photographing direction information for the cameras before switching and after switching, after calibration position storage section 2903 receives calibration from calibration section 2902 (step S3004). Next, camera control information transmitting/receiving section 124 changes the photographing directions before switching and after switching based on this photographing direction information (step S3005). Switching image generating section 2904 provides the switching image to camera image switching section 121 after camera control information transmitting/receiving section 124 exerts control to change the photographing direction of the cameras. Camera image switching section 121 provides this switching image to image display section 122 (step S3006). Image display section 122 displays this switching image at monitor 130 (step S3007). Camera control information transmitting/receiving section 124 then returns the photographing directions of the cameras back to the state before control was exerted to make changes, from the photographing directions for the cameras before changing of the acquired photographing directions.

On the other hand, in the event that it is determined in step S3002 that switching image generation requirement determination section 2901 does not generate a switching image, wide angle processing of the zoom magnification of the camera after switching is proceeded with as described in Embodiment 2 (step S3008).

According to Embodiment 5, in addition to the results of Embodiments 1 to 4, switching image generating section 2904 generates a switching image constituting an intermediate image for images of the cameras before switching and after switching according to the installation positions of the cameras so than it is therefore possible. For the user to intuitively understand the photographing direction of the image after switching.

Figure 33:
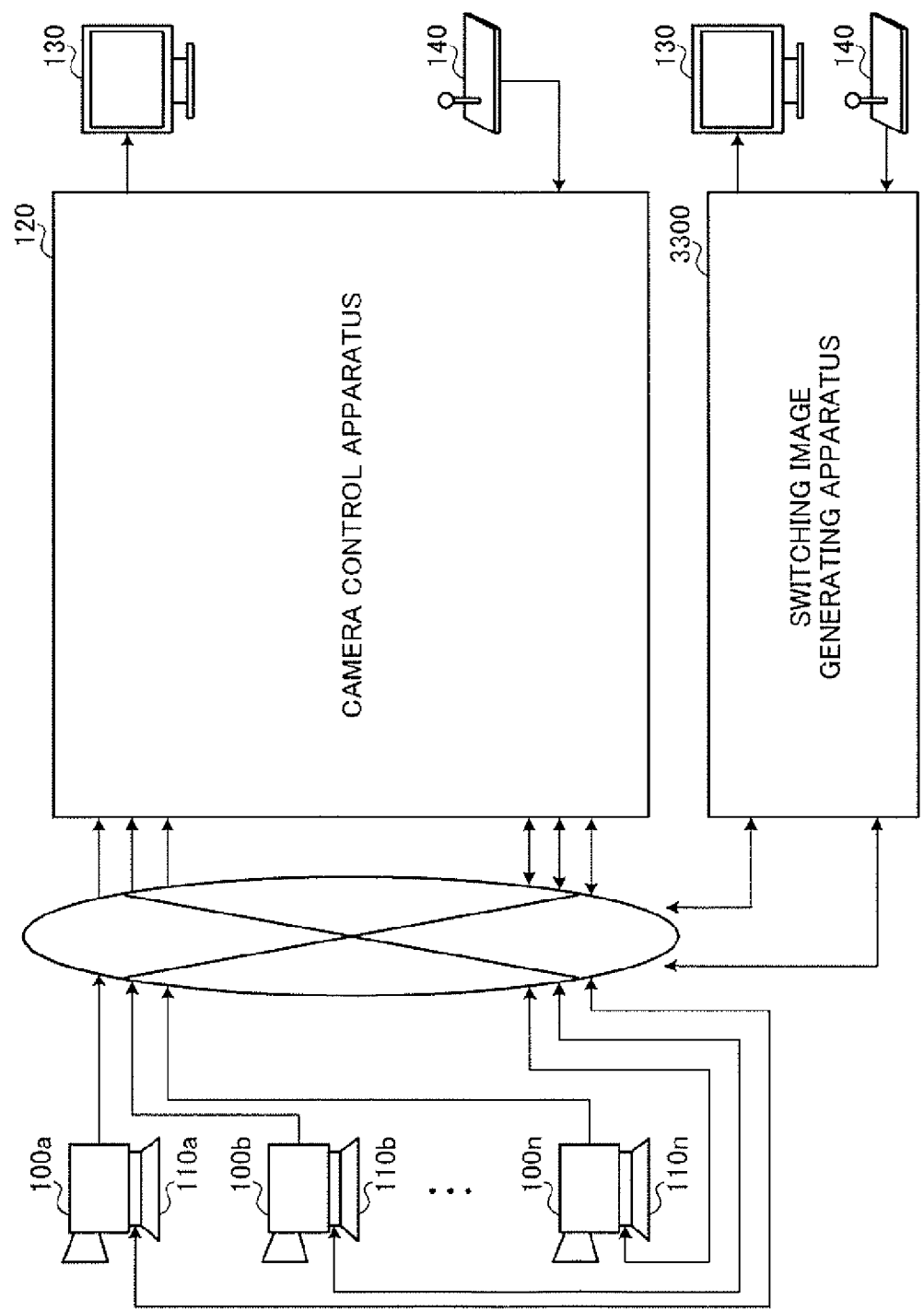
FIG. 33 shows an example of a configuration where switching image generation apparatus according to Embodiment 5 of the present invention are connected via camera control apparatus and a network.

In Embodiment 5, a description is given of a configuration where camera common apparatus 120 generates a switching image but the present invention is not limited to this configuration. For example, as shown in FIG. 33, a configuration may be adopted where switching image generating apparatus 3300 having a calibration section 2902, calibration position storage section 2903 and switching image generating section 2904 etc. is provided independently and connected to cameras 100a to 100n and camera control apparatus 120 via a network such as the Internet, etc.

Figure 34:
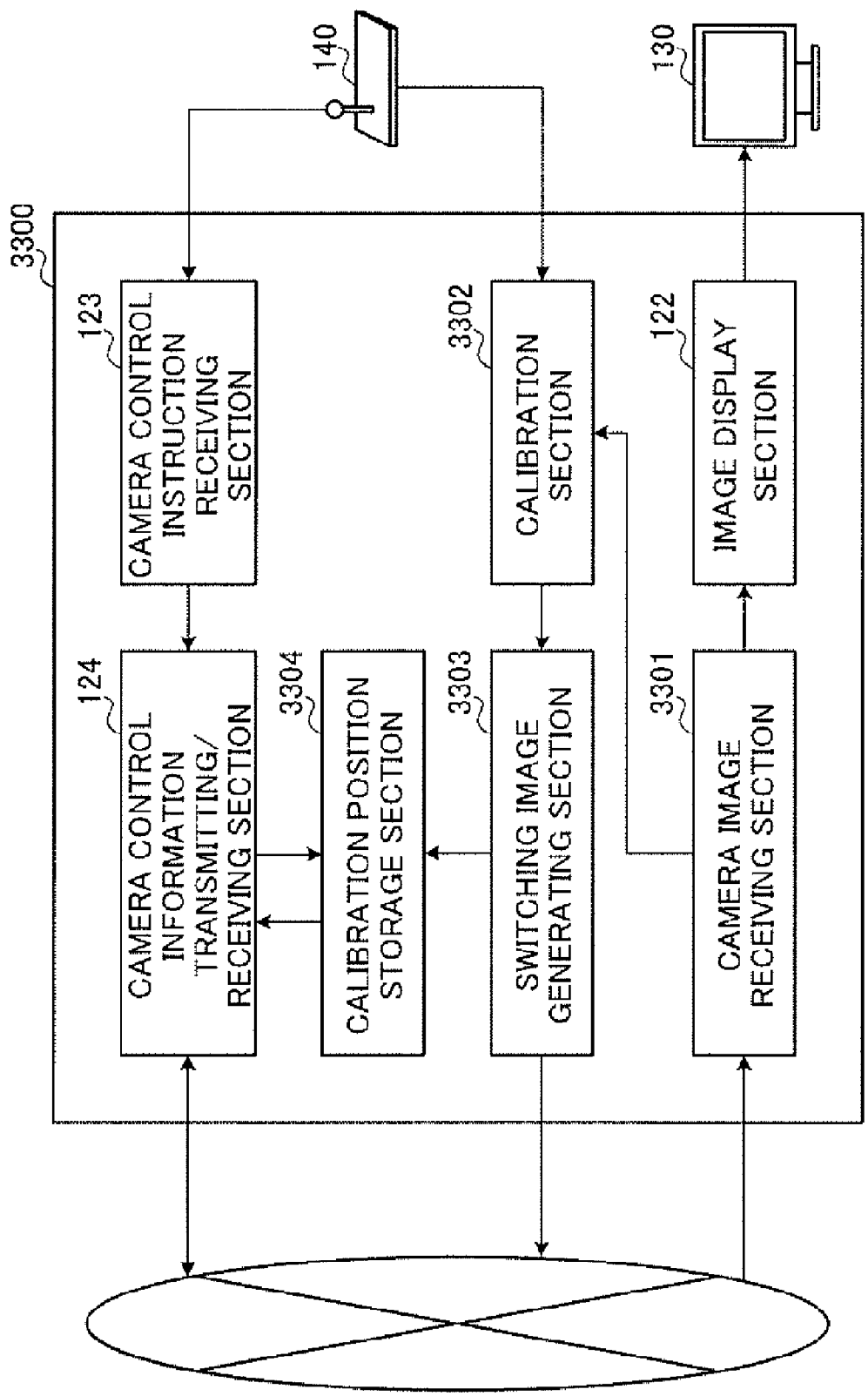
FIG. 34 shows an example of a configuration of switching image generation apparatus of FIG. 33.

An example of a configuration for switching image generating apparatus 3300 in this case is shown in FIG. 34. The system administrator instructs camera control information transmitting/receiving section 124 via camera control instruction receiving section 123 in such a manner that the photographing directions of two cameras of the installed cameras face towards the same object. Camera control information transmitting/receiving section 124 exerts control to change the photographing direction of the cameras via the network. Further, camera image receiving section 3301 acquires images for a camera for which the photographing direction is controlled to change by camera control information transmitting/receiving section 124 via the network and provides these to calibration section 3302. Calibration section 3302 carries out calibration from images of the two cameras and provides the calibration results to switching image generating section 3303. Switching image generating section 3303 generates a switching image displaying an intermediate state of the images of the two cameras from the calibration results. Moreover, calibration position storage section 3304 stores photographing directions for the two cameras after calibration.

Further configuration of camera control apparatus 120 of Embodiment 5 is not limited to this configuration, and application of camera control apparatus 120 of Embodiments 1 to 4 is also possible.

This specification is based on Japanese patent application no. 2005-016475 filed on Jan. 25, 2005, the entire content of which is expressly incorporated by reference herein.

INDUSTRIAL APPLICABILITY

The camera control apparatus and zoom magnification control method for the camera control apparatus of the present invention enables a user to intuitively understand photographing direction and zoom magnification of a camera simply by looking at an image itself of the camera after selection while the user is selecting a camera, has the effect of making it possible to immediately start to control the camera in order for the user to observe the image, and is useful in a remote monitoring system where an unspecified large number of users look at images of a plurality of cameras capable of being operated remotely.

The invention claimed is:

1. A camera control apparatus controlling a plurality of cameras and displaying one or a plurality of images of the plurality of cameras, comprising:
    an image switching section that switches over to an image of a camera instructed to be switched over to by a user;
    a zoom magnification control section that acquires zoom magnification of the camera instructed to be switched over to, changes the zoom magnification of the camera to a reference magnification lower than the acquired zoom magnification before switching of the image switching section, and changes zoom magnification of the camera after switching from the reference magnification to the acquired zoom magnification; and
    an image display section that displays an image of the camera the image switching section switches over to.

2. The camera control apparatus according to claim 1, wherein the zoom magnification control section adjusts a speed of changing the zoom magnification of the camera from the reference magnification to the acquired zoom magnification based on a frame rate of the image of the camera the image switching section switches over to or a frame rate of the camera image displayed by the image display section.

3. The camera control apparatus according to claim 2, the zoom magnification control section further comprising a control information display section that displays the state of changing the camera zoom magnification from the reference magnification to the acquired zoom magnification.

4. The camera control apparatus according to claim 1, further comprising a photographing direction control section that acquires photographing direction information specifying photographing direction of the camera instructed to be switched over to, and changes the image photographing direction of the camera before switching to be close to the image photographing direction of the camera instructed to be switched over to, based on the photographing direction information.

5. The camera control apparatus according to claim 4, wherein the photographing direction control section acquires photographing range information specifying the photographing range of the camera changed to the reference magnification, and changes the photographing range for the image of the camera before switching to be close to the photographing range for the image of the camera instructed to be switched over to based on the photographing range information.

6. The camera control apparatus according to claim 1, further comprising:
    a landmark image registration section that registers image information for a landmark existing within the photographing range of each camera and specifying the photographing direction of the cameras; and
    a landmark recognition section that determines whether or not landmark image information exists within the camera image instructed to be switched over to, and stops the operation of the zoom magnification control section changing the zoom magnification from the acquired zoom magnification to the reference magnification in the event that the landmark image information exists.

7. The camera control apparatus according to claim 1, further comprising:
    a landmark position registration section that registers position information for a landmark existing within the photographing range of each camera and specifying the photographing direction of the camera;
    a landmark position calculating section that calculates a position of the landmark from the position information, and position information, photographing direction and field angle of the camera before switching; and a landmark determining section that stops the operation of the zoom magnification control section changing from the acquired zoom magnification to the reference magnification in the event that the position of the landmark exists within the image of the camera instructed to be switched over to.

8. The camera control apparatus according to claim 1, further comprising:

a switching image generation determining section that determines whether or not to generate a switching image for changing from a camera image before switching to an image of the camera instructed to be switched over to based on the installation positions of the camera before switching and the camera instructed to be switched over to; and a switching image generating section that generates and provides to the image switching section the switching image in the event that the switching image is determined to be generated.

9. A zoom magnification control method for camera control apparatus controlling a plurality of cameras and displaying one or a plurality of images of the plurality of cameras, comprising:

a reference magnification setting step that acquires zoom magnification of the camera instructed to be switched over to by a user, and sets zoom magnification of the camera to a reference magnification lower than the acquired zoom magnification;

a switching step that switches to the image of the camera set to the reference magnification;

an image display step that displays an image of the switched to camera; and a zoom magnification changing step that changes the zoom magnification of the camera the image is displayed for from the reference magnification to the acquired zoom magnification.

* * * * *